United States Patent [19]
Bach et al.

[11] Patent Number: 6,128,622
[45] Date of Patent: Oct. 3, 2000

[54] IMS WEB STUDIO TASKGUIDE

[75] Inventors: Mark Alan Bach; In Ha Chung; John Kevin Flanigan; Candace Antonina Garcia; Judith Eleanor Hill; Steve T. Kuo; Theresa Hsing Lai, all of San Jose; Kevin Michael McBride, Menlo Park; H. Moncrief Rowe-Anderson, San Jose, all of Calif.

[73] Assignee: International Business Machines Corporation, Armonk, N.Y.

[21] Appl. No.: 09/042,238

[22] Filed: Mar. 13, 1998

Related U.S. Application Data
[60] Provisional application No. 60/067,292, Nov. 26, 1997.

[51] Int. Cl.[7] .................................................. G06F 17/30
[52] U.S. Cl. ............................................. 707/103; 707/102
[58] Field of Search ............................... 707/4, 101, 103, 707/104, 102

[56] References Cited

U.S. PATENT DOCUMENTS

| | | |
|---|---|---|
| 5,161,225 | 11/1992 | Abraham et al. . |
| 5,212,787 | 5/1993 | Baker et al. . |
| 5,235,701 | 8/1993 | Ohler et al. . |
| 5,280,610 | 1/1994 | Travis, Jr. et al. . |
| 5,291,583 | 3/1994 | Bapat . |
| 5,295,256 | 3/1994 | Bapat . |
| 5,297,279 | 3/1994 | Bannon ................................... 707/103 |
| 5,303,379 | 4/1994 | Khoyi et al. . |
| 5,329,619 | 7/1994 | Pagé et al. . |
| 5,379,419 | 1/1995 | Hefferman et al. . |
| 5,414,812 | 5/1995 | Filip et al. . |
| 5,421,015 | 5/1995 | Weinreb et al. . |
| 5,437,027 | 7/1995 | Bannon et al. . |
| 5,440,547 | 8/1995 | Easki et al. . |
| 5,442,779 | 8/1995 | Barber ......................................... 707/4 |
| 5,452,445 | 9/1995 | Hallmark et al. . |
| 5,455,948 | 10/1995 | Poole et al. . |
| 5,459,860 | 10/1995 | Burnett et al. . |
| 5,471,615 | 11/1995 | Armatsu et al. . |
| 5,487,064 | 1/1996 | Galand . |
| 5,499,371 | 3/1996 | Henninger et al. . |
| 5,542,078 | 7/1996 | Martel ....................................... 707/101 |
| 5,544,325 | 8/1996 | Denny et al. . |
| 5,546,582 | 8/1996 | Brockmeyer et al. . |
| 5,563,878 | 10/1996 | Blakeley et al. . |
| 5,564,050 | 10/1996 | Barber et al. . |
| 5,581,756 | 12/1996 | Nakabayashi et al. . |
| 5,613,099 | 3/1997 | Erickson et al. . |
| 5,627,979 | 5/1997 | Chang ....................................... 707/104 |
| 5,675,801 | 11/1997 | Lindsey ....................................... 714/38 |
| 5,699,310 | 12/1997 | Garloff et al. .............................. 717/1 |
| 5,924,101 | 7/1999 | Bach et al. ............................... 707/103 |
| 5,960,200 | 9/1999 | Eager et al. ................................. 717/5 |
| 6,038,378 | 11/1997 | Kitta et al. ................................ 714/38 |

OTHER PUBLICATIONS

Muchenhaupt, Kenneth J., "Preserving Current Assets With Objects on MVS White Paper," Mar. 15, 1996, at http://www.s390.ibm.com/products/wp/wrapwp.html.

"The Essential Distributed Objects Survival Guide—Chapter 8 CORBA Services: Persistence and Object Databases," at http://koh.kyungpook.as,kr/members/gwh/ai8.html. Date unknown.

IBM Corporation. "IMS in an Object Oriented World," San Jose, California, Jul. 12, 1995, pp. 1–53.

Howe III, Jack L., "IMS/OO—Overview: Objects in IMS Are Closer Than They Appear", IBM Corporation, Overheads from presentation at SHARE '95, Feb. 23, 1995.

Howe III., Jack L., "Objects in the IMS are closer Than They Appear", IBM Corporation, Overheads from presentation at IBM Technical Interchange'95, May 20, 1995.

"voyager/C++ Client/Server Object Management System," Secant Technologies, Inc., 1995.

Primary Examiner—Wayne Amsbury
Attorney, Agent, or Firm—Gates & Cooper

[57] ABSTRACT

A method, apparatus, and article of manufacture for generating program specifications for a computer program that accesses datastore persistent objects materialized from a datastore. A "wizard" or "task guide" is displayed on a monitor attached to a computer, wherein the wizard comprises a step-by-step procedure for creating the program specifications. Operator input is accepted into the computer in response to the step-by-step procedure and the program specifications are created using the operator input.

81 Claims, 18 Drawing Sheets

IMS WEB STUDIO TASKGUIDE

CROSS-REFERENCE TO RELATED APPLICATIONS

This application claims the benefit under 35 U.S.C. §119 (e) of commonly-assigned U.S. Provisional application serial number 60/067,292, now abandoned entitled "A USER INTERFACE FOR CREATING PROGRAM SPECIFICATIONS FOR ACCESSING DATASTORE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, which application is incorporated by reference herein.

This application is related to the following co-pending and commonly-assigned patent applications:

Application Ser. No. 08/949,638, entitled "A USER INTERFACE FOR CREATING CLASS DEFINITIONS AND IMPLEMENTATIONS FOR DATASTORE PERSISTENT OBJECTS," filed on Oct. 14, 1997, by Mark Alan Bach, Shyh-Mei F. Ho, Kevin Michael McBride, H. Moncrief Rowe-Anderson and Thomas Beavers Sander, now U.S. Pat. No. 5,924,101;

Application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, now U.S. Pat. No. 5,781,739;

Application Ser. No. 08/736,762, entitled "A FRAMEWORK FOR OBJECT-ORIENTED ACCESS TO NON-OBJECT-ORIENTED DATASTORES," filed on Oct. 25, 1996, by Kenneth R. Blackman and Jack L. Howe III, now U.S. Pat. No. 5,799,313;

Application Ser. No. 08/736,763, entitled "A METHOD FOR REPRESENTING NON-OBJECT-ORIENTED DATASTORES USING A COLLECTION OF COLLECTIONS DATA MODEL," filed on Oct. 25, 1996, by Kenneth R. Blackman and Jack L. Howe III, now U.S. Pat. No. 5,794,248;

Application Ser. No. 08/738,294, entitled "A METHOD FOR THE INCREMENTAL PRESENTATION OF NON-OBJECT-ORIENTED DATASTORES USING AN OBJECT-ORIENTED QUERYABLE DATASTORE COLLECTION," filed on Oct. 25, 1996, by Kenneth R. Blackman and Jack L. Howe III, now U.S. Pat. No. 5,781,907;

Application Ser. No. 08/738,104, entitled "A QUERY SYNTAX FOR ACCESSING NON-RELATIONAL, NON-OBJECT-ORIENTED DATASTORES," filed on Oct. 25, 1996, by Kenneth R. Blackman and Jack L. Howe III, now U.S. Pat. No. 5,778,379;

Application Ser. No. 08/738,082, entitled "A QUERY PARSER FOR ACCESSING NON-RELATIONAL, NON-OBJECT-ORIENTED DATASTORES," filed on Oct. 25, 1996, by Kenneth R. Blackman and Jack L. Howe III, now U.S. Pat. No. 5,778,358;

Application Ser. No. 08/738,330, entitled "A METHOD FOR USING A DATASTORE CURSOR FOR THE INCREMENTAL PRESENTATION OF QUERY RESULTS WHEN TRAVERSING IMPLIED COLLECTIONS IN NON-OBJECT-ORIENTED DATASTORES," filed on Oct. 25, 1996, by Kenneth R. Blackman and Jack L. Howe III, now U.S. Pat. No. 5,787,436;

Application Ser. No. 08/736,759, entitled "A METHOD FOR REPRESENTING DATA FROM NON-RELATIONAL, NON-OBJECT-ORIENTED DATASTORES AS QUERYABLE DATASTORE PERSISTENT OBJECTS," filed on Oct. 25, 1996, by Kenneth R. Blackman and Jack L. Howe III, now U.S. Pat. No. 5,794,247;

Application Ser. No. 08/736,764, entitled "A METHOD FOR ENCAPSULATING DATA FROM NON-OBJECT-ORIENTED DATASTORES AS DATASTORE PERSISTENT OBJECTS," filed on Oct. 25, 1996, by Kenneth R. Blackman and Jack L. Howe III, now U.S. Pat. No. 5,765,161;

Application Ser. No. 08/738,103, entitled "A METHOD FOR USING QUERYABLE PERSISTENT IDENTIFIERS TO LOCATE DATA FOR DATASTORE PERSISTENT OBJECTS IN NON-OBJECT-ORIENTED DATASTORES," filed on Oct. 25, 1996, by Kenneth R. Blackman and Jack L. Howe III, now U.S. Pat. No. 5,765,163;

Application Ser. No. 08/736,983, entitled "A METHOD FOR INTERFACING QUERYABLE DATASTORE PERSISTENT OBJECTS TO NON-RELATIONAL, NON-OBJECT-ORIENTED DATASTORES," filed on Oct. 25, 1996, by Kenneth R. Blackman and Jack L. Howe III, now U.S. Pat. No. 5,761,671;

Application Ser. No. 08/736,952, entitled "A METHOD FOR MANAGING QUERYABLE DATASTORE PERSISTENT OBJECTS AND QUERYABLE DATASTORE COLLECTIONS IN AN OBJECT-ORIENTED ENVIRONMENT," filed on Oct. 25, 1996, by Kenneth R. Blackman and Jack L. Howe III, now U.S. Pat. No. 5,765,162;

Application Ser. No. 08/736,765, entitled "A METHOD FOR CATALOGING DATASTORE CHARACTERISTICS AND DEFINING AND GENERATING DATASTORE PERSISTENT OBJECTS," filed on Oct. 25, 1996, by Kenneth R. Blackman and Jack L. Howe III, now U.S. Pat. No. 5,737,597;

Application Ser. No. 08/736,922, entitled "A METHOD FOR CAPTURING AND CATALOGING DATASTORE CHARACTERISTICS TO DEFINE DATASTORE PERSISTENT OBJECTS," filed on Oct. 25, 1996, by Kenneth R. Blackman and Jack L. Howe III, now U.S. Pat. No. 5,809,508;

Application Ser. No. 08/738,102, entitled "A METHOD FOR CAPTURING AND CATALOGING SPECIFICATIONS FOR DATASTORE PERSISTENT CLASSES," filed on Oct. 25, 1996, by Kenneth R. Blackman and Jack L. Howe III, now U.S. Pat. No. 5,737,598;

Application Ser. No. 08/738,105, entitled "A METHOD FOR USING A NON-OBJECT-ORIENTED DATASTORE AS A GENERIC PERSISTENT DATASTORE FOR PERSISTENT OBJECTS," filed on Oct. 25, 1996, by Kenneth R. Blackman and Jack L. Howe III, now U.S. Pat. No. 5,809,509;

Application Ser. No. 08/736,761, entitled "METHOD FOR CAPTURING AND CATALOGING PROGRAM CHARACTERISTICS FOR THE USAGE OF DATASTORE PERSISTENT CLASSES," filed on Oct. 25, 1996, by Kenneth R. Blackman and Jack L. Howe III, now U.S. Pat. No. 5,764,979;

all of which applications are incorporated by reference herein.

BACKGROUND OF THE INVENTION

1. Field of the Invention

The present invention relates generally to computerized methods for accessing datastores, and in particular, to a computerized method for creating an interface for accessing datastore persistent objects from an Internet browser and server.

2. Description of Related Art

It is well known in the art to use database management systems, such as IBM's IMS™ (Information Management System) database management system, to manage computerized datastores. Indeed, IMS™ has been used for decades and remains in use today. Currently, there is a need to access such "legacy" datastores using object-oriented programming (OOP) techniques. In addition, there is a need to access such legacy datastores from the Internet and World Wide Web (also known as "WWW" or the "Web"). However, there are few tools available to assist programmers in these endeavors. Thus, there is a need in the art for improved tools to facilitate bridging between non-object-oriented datastores and object-oriented applications and to minimize the need to write code for accessing the external datastore. Moreover, there is a need in the art for improved tools to facilitate generating interface programs for Web servers and Web browsers.

SUMMARY OF THE INVENTION

To overcome the limitations in the prior art described above, and to overcome other limitations that will become apparent upon reading and understanding the present specification, the present invention discloses a method, apparatus, and article of manufacture for generating program specifications for a computer program that accesses datastore persistent objects materialized from a datastore. A "wizard" or "task guide" is displayed on a monitor attached to a computer, wherein the wizard comprises a step-by-step procedure for creating the program specifications. Operator input is accepted into the computer in response to the step-by-step procedure and the program specifications are created using the operator input.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention captures information for generating program specifications for a computer program that accesses datastore persistent objects materialized from a datastore. A computerized system in accordance with the principles of the present invention includes an external non-object-oriented datastore, a datastore manager for controlling access to the external datastore, an object-oriented bridge for instantiating or materializing data retrieved from the external datastore as datastore persistent objects; a Web server for providing Internet access to the materialized datastore persistent objects, and an interface between the Web server and object-oriented bridge. The computerized system also includes a "wizard" or task guide that defines program specifications for the interface that interacts with the bridge when accessing the datastore persistent objects.

Hardware Environment

Figure 1:
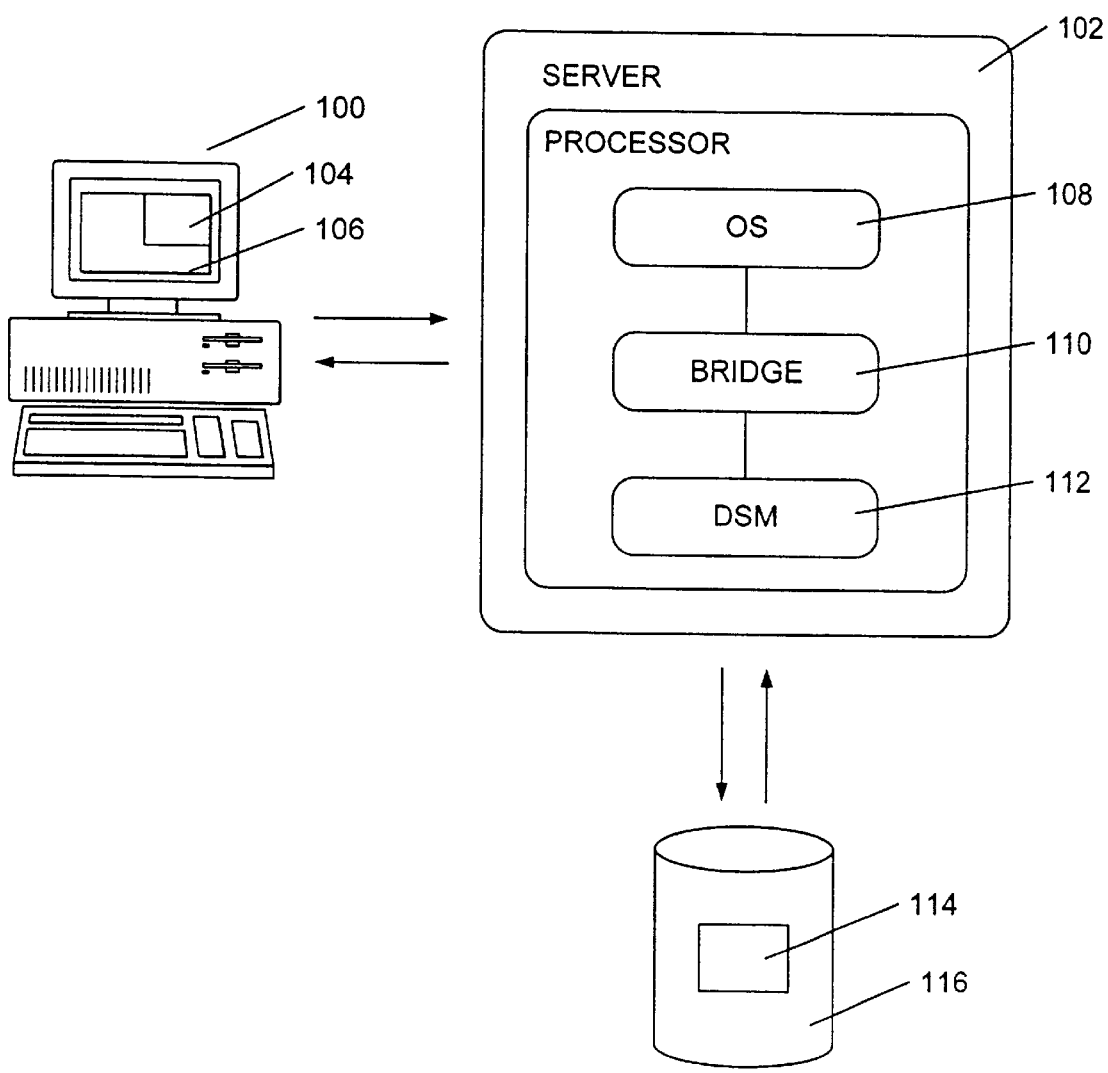
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A workstation or terminal 100 communicates via a network with a server computer 102. Both the workstation 100 and the server computer 102 are typically comprised of one or more processors, random access memory (RAM), read-only memory (ROM), and other components such as monitors, data storage devices, data communications devices, etc. In the preferred embodiment, the network comprises the Internet or World-Wide-Web, although those skilled in the art will recognize that other networks could be used as well.

The workstation 100 executes one or more computer programs 104 under the control of an operating system 106, such as the MVS™, VM™, AIX™, OS/2™, Windows™, Macintosh™, AS/400™, UNIX™, or other operating systems. The computer program 104 transmits commands to the server computer 102 for performing various functions and receive data from the server computer 102 in response to the commands. In a preferred embodiment, the computer program comprises a browser 104, such as Microsoft's Internet Explorer or Netscape's Navigator, although those skilled in the art will recognize that other programs could be used as well.

The server computer 102 also operates under the control of an operating system 108, such as the MVS™, VM™, AIX™, OS/2™, Windows™, Macintosh™, AS/400™, UNIX™ or other operating systems. The server computer 102 executes one or more computer programs 112, 114, 118, and 120 under the control of the operating system 108. These computer programs 112, 114, 118, and 120 receive commands from the workstation 100 for performing various functions and transmit data to the workstations 100 in response to the commands. In the preferred embodiment, the programs comprise a Web server or daemon 118, such as IBM's HyperText Transport Protocol (HTTP) daemon or other WWW daemon, an interface 120, a bridge 110, and a data store manager 112.

Currently, several standards exist that can be used for programming and structuring the interface 120 between the HTTP daemon 118 and the bridge 110. These standards include the Common Gateway Interface (CGI), the Netscape Server Application Programming Interface (NSAPI), and the Internet Connection Server Application Programming Interface (ICAPI). For illustration purposes only, the interface 120 between the HTTP daemon 118 and the bridge 110 herein is assumed to conform to the CGI standard, although those skilled in the art will recognize that other standards could be used as well. Moreover, the interface 120 is further described in co-pending and commonly-assigned application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, now U.S. Pat. No. 5,781,739 which is incorporated by reference herein, where the interface 120 is referred to as the CGI-BIN program 105 in its preferred (although not exclusive) embodiment.

The server computer 102 manages one or more external databases or datastores 114 stored on one or more data storage devices 116 (such as a fixed or hard disk drive, a floppy disk drive, a CD-ROM drive, a tape drive, or other device). In the preferred embodiment, the external datastore 114 comprises an IMS™ datastore and is managed by the datastore manager 112 that comprises an IMS™ database management system (DBMS) product offered by IBM Corporation. Those skilled in the art will recognize, however, that the present invention may be applied to any datastore and associated database management system.

The present invention is generally implemented using eight major components executed by the workstation 100 and the server computer 102, i.e., browser 104, workstation operating system 106, server operating system 108, HTTP daemon 118, interface 120, bridge 110, datastore manager (DSM) 112, and external datastore 114. The browser 104 performs end-user functions; the workstation operating system 106 controls the operation of the workstation 100; the server operating system 108 controls the operation of the server computer 102; the HTTP daemon 118 provides the Web support, the interface 120 connects the HTTP daemon 118 to the bridge 110, the bridge 110 materializes data retrieved from the external datastore 114 as objects; and the datastore manager 112 controls access to the external datastore 114.

Generally, these computer programs 104–112 and 118–120 are all tangibly embodied in or retrievable from a computer-readable medium, device, or carrier, e.g., a data storage device or a remote device coupled to either the workstation 100 or the server computer 102 via a data communications device. Moreover, the computer programs 104–112 and 118–120 are all comprised of instructions and/or data which, when read, executed, and/or interpreted by the workstation 100 and/or server computer 102, causes the workstation 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to a computer program performing the same or similar functionality. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Datastore Model

Figure 2:
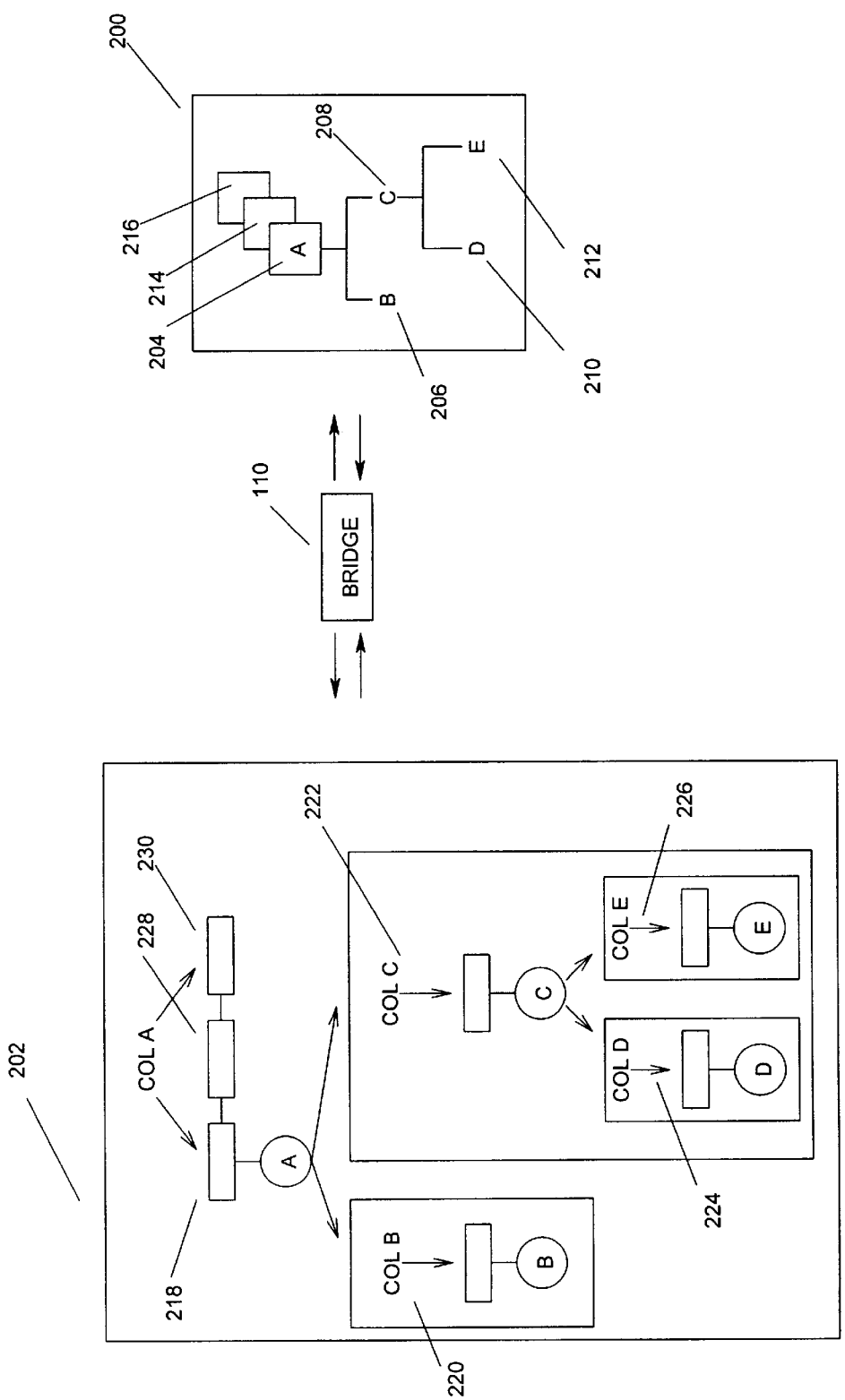
FIG. 2 is a block diagram illustrating a collection of collections data model according to the present invention.

FIG. 2 is a block diagram illustrating the collection of collections data model used in the present invention. Data retrieved from the non-object-oriented external datastore 114 is modeled as a "collection of object collections" in the bridge 110. Where the external data has a simple structure, each record is encapsulated as an object, which becomes a member of an object collection. Where the records are hierarchical in structure, that hierarchical structure is modeled by creating object collections and then hierarchically connecting the related object collections. Other complex logical records also can be modeled as a hierarchy of object collections. A single collection of collections is materialized for each datastore, e.g., the object model of two flat files is a model having two collections of collections.

Block 200 represents the logical hierarchical structure of the data as stored in the external datastore 114, and block 202 represents the logical "collection of object collections" structure created from the data retrieved from the external datastore 114. The bridge 110 translates the data between the differing formats and structures in blocks 200 and 202.

In the logical hierarchical structure of block 200, parent record A (204) has children records B (206) and C (208), and child record C (208) is also a parent of children records D (210) and E (212). There may also be multiple instances of parent record A (214 and 216).

Similarly, in the logical "collection of object collections" structure of block 202, parent object A (218) has children objects B (220) and C (222), and child object C (222) is also a parent of children objects D (224) and E (226). Further, there are multiple instances of parent object A (228 and 230). Each of these objects is a datastore persistent object (DPO) that encapsulates a logical unit of data, i.e., record, retrieved from the non-object-oriented external datastore 114, and includes member functions for manipulating the encapsulated data. Thus, the difference between blocks 200 and 202 is that each record A, B, or C in block 200 is represented by a DPO in block 202, and the hierarchy in block 200 is represented by the collections of object collections in block 202.

Datastore Collection

The bridge 110 manages "datastore collections", which are the foundation of the "collections of object collections" data model. The members of the datastore collection are the DPOs. The datastore collection also includes a query evaluator having a query syntax and a query parser, a queryable datastore cursor, and an associated result collection with a cursor. For complex queries, queries may be sub-divided Results for the queries are presented in user-specifiable increments, which permits the delivery of large result collections while controlling use of memory.

Figure 3:
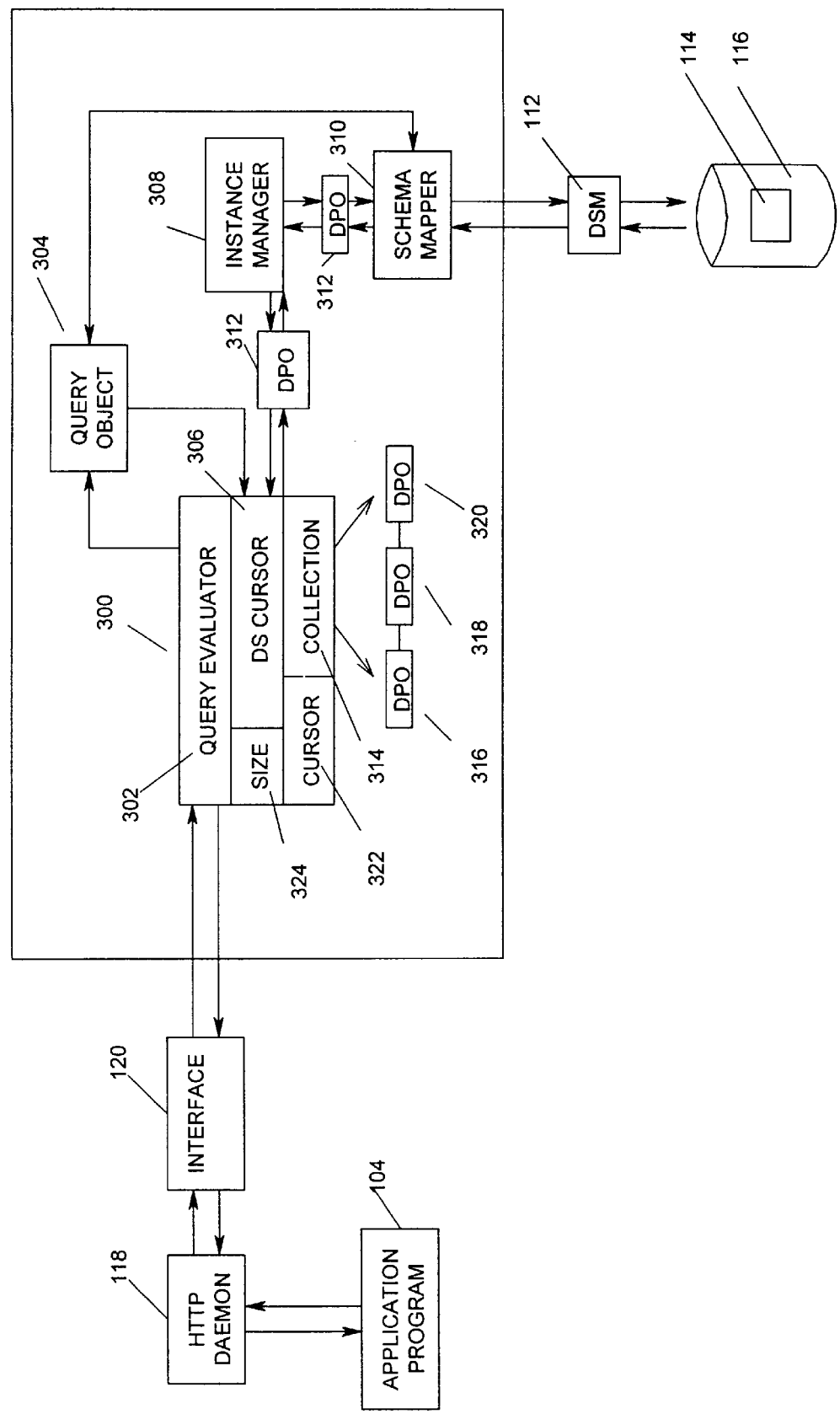
FIG. 3 is a block diagram illustrating an exemplary datastore collection of the bridge according to the present invention.

FIG. 3 is a block diagram illustrating an exemplary datastore collection 300 of the bridge 110 according to the present invention. The datastore collection 300 includes a query evaluator 302 for receiving a query from the interface 120, wherein the query evaluator 302 comprises a query syntax and a query parser. The query evaluator 302 parses the query request in accordance with the query syntax and stores the parsed request in a parse table in a query object 304. A datastore cursor 306 retrieves the parsed query from the query object 304 and provides the parsed query to an instance manager 308, which coordinates requests from the interface 120 with the datastore collection 300 and the external datastore 114. The instance manager 308 uses a schema mapper 310 to interface with the datastore manager 112. The datastore manager 112 retrieves data from the external datastore 114 on the external storage device 116 and returns the requested data to the schema mapper 310. The schema mapper 310 translates common elements between the requested data retrieved from the external datastore 114 and a DPO 312, which results in the requested data being encapsulated in the DPO 312. The schema mapper 310 returns the DPO 312 through the instance manager 308 to the datastore cursor 306 which stores the DPO 312 in the result collection 314. Generally, the result collection 314 comprises one or more DPOs 316, 318, and 320.

The datastore cursor 306 populates the result collection 314 so that the interface 120 can incrementally access the query result. Because the number of data items or records requested by the query may be large, the datastore cursor 306 only populates the result collection 314 with a specified number of DPOs 316, 318, and 320 that correspond to the query request. A pointer to the current DPOs 316, 318, or 320 is maintained by the cursor 322, and the size of the result collection 314 is determined by a size variable 324.

If the interface 120 needs to access more data items or records that satisfy a query, the datastore cursor 306 deletes one or more of the DPOs 316, 318, and 320 from the result collection 314 and requests the instance manager 308, through the schema mapper 310, to retrieve additional DPOs 312, up to the number indicated in the size variable 324, into the result collection 314.

In addition to populating a DPO 312 with data from the external datastore 114, the schema mapper 310 updates the external datastore 114 with changed data from the DPO 312. The schema mapper 310 may add data to the external datastore 114 when a new DPO 312 is created, and the schema mapper 310 may delete corresponding data from the external datastore 114 when a existing DPO 312 is deleted.

The schema mapper 310 translates queries to specific instructions for the datastore manager 112. Generally, these instructions comprise: SELECT, UPDATE, INSERT and DELETE, wherein the SELECT instruction retrieves data from the external datastore 114 via the datastore manager 112 for a DPO 312; the UPDATE instruction, following a SELECT, saves changed data from the DPO 312 into the external datastore 114 via the datastore manager 112; the INSERT instruction saves new data from the DPO 312 into the external datastore 114 via the datastore manager 112; and the DELETE instruction deletes the DPO 312 and its corresponding data from the external datastore 114 via the datastore manager 112.

Datastore Persistent Objects (DPOs)

The members, or elements, of the datastore collection 300 are queryable DPOs 316, 318, and 320 that encapsulate external data, i.e., records retrieved from the external datastore 114, with associated methods to move data with data type integrity between the DPOs 316, 318, and 320, and the records of the external datastore 114. Thus, a DPO 316, 318, and 320 makes non-object-oriented data accessible as "base class objects" that may be used or wrappered by other classes in an object-oriented programming system. Further, the data being encapsulated by the DPO 316, 318, and 320 may or may not be concurrently shared or updated between object-oriented and non-object-oriented applications, depending on the characteristics of the underlying datastore 114.

The bridge 110 thus comprises a queryable persistence implementation that can be used to access data in non-object-oriented datastores 116. The bridge 110 provides a datastore persistent object class to wrapper data retrieved from the external datastore 114, a queryable persistent identifier (PID) used to specify information used to locate the data in the external datastore 114 needed to populate the particular DPO 312, and a schema mapper class used to obtain the required data from the external datastore 114 and translate or transfer it into the format of the particular DPO 312.

Figure 4:
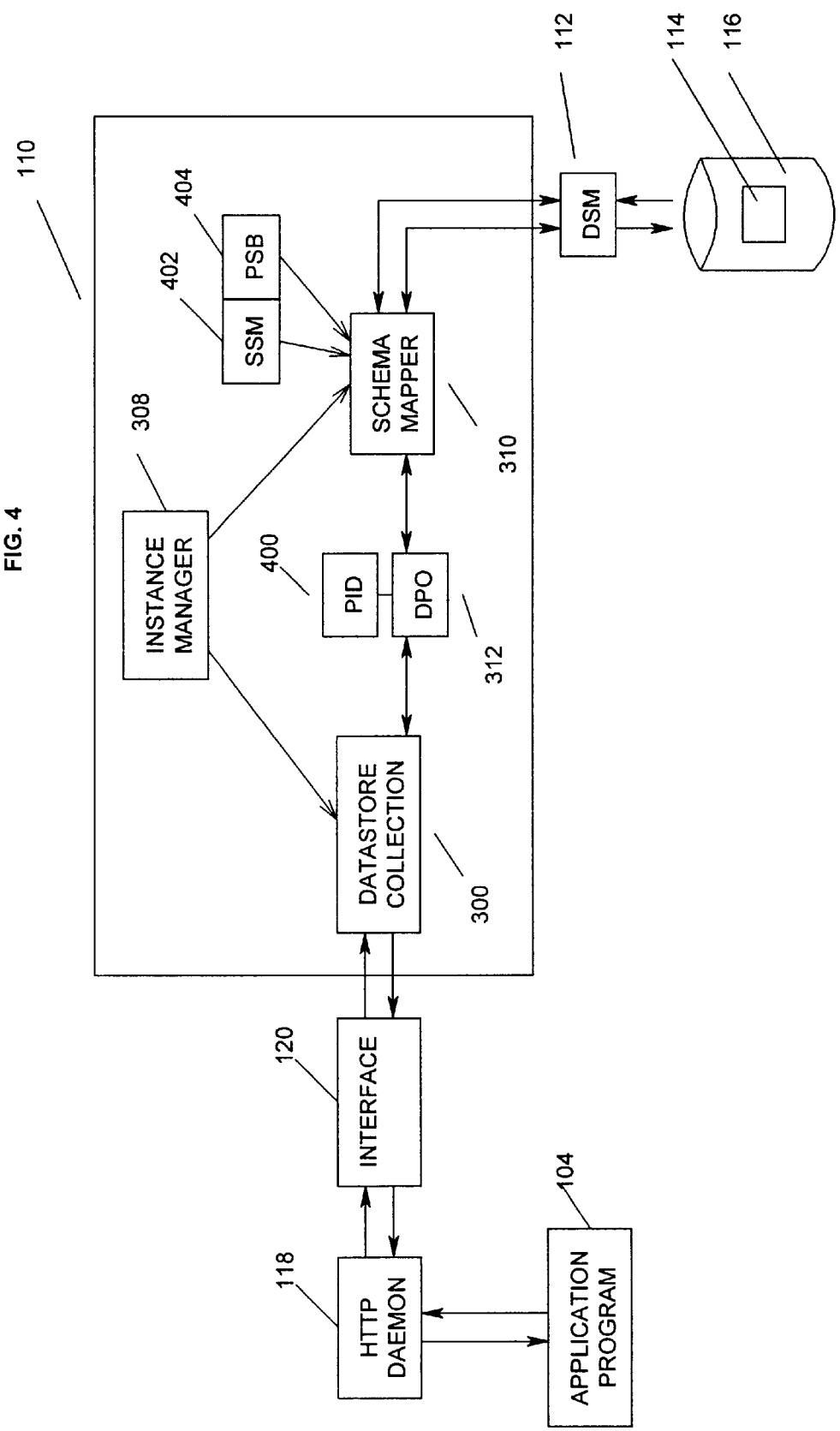
FIG. 4 is a block diagram illustrating the operation of the bridge according to the present invention.

FIG. 4 is a block diagram illustrating the operation of the bridge 110 according to the present invention. The interface 120 passes a query request to the datastore collection 300. The datastore collection 300 evaluates the query and passes control to the datastore cursor 306 for processing. The datastore cursor 306 creates a DPO 312 and its associated PID 400. The PID 400 is used to specify the query information needed to locate the data in the external datastore 114.

The DPO 312 and PID 400 are passed to the instance manager 308 who requests that the schema mapper 310 retrieve the data via the datastore manager 112 for storing into the DPO 312. The schema mapper 310 looks at the DPOs 312 accompanying PID 400 which has information from the query object 304 for locating data. The schema mapper 310 provides the input/output commands to the datastore manager 112 using information from a subschema mapper 402 and program specification block (PSB) 404. The schema mapper 310 receives the located logical unit of data from the datastore manager 112 and maps the located data into the DPO 312, thereby "wrappering" the logical unit of data. Upon completion of the operation, the DPO 312 then encapsulates the data retrieved by the schema mapper 310.

Instance Manager

Figure 5:
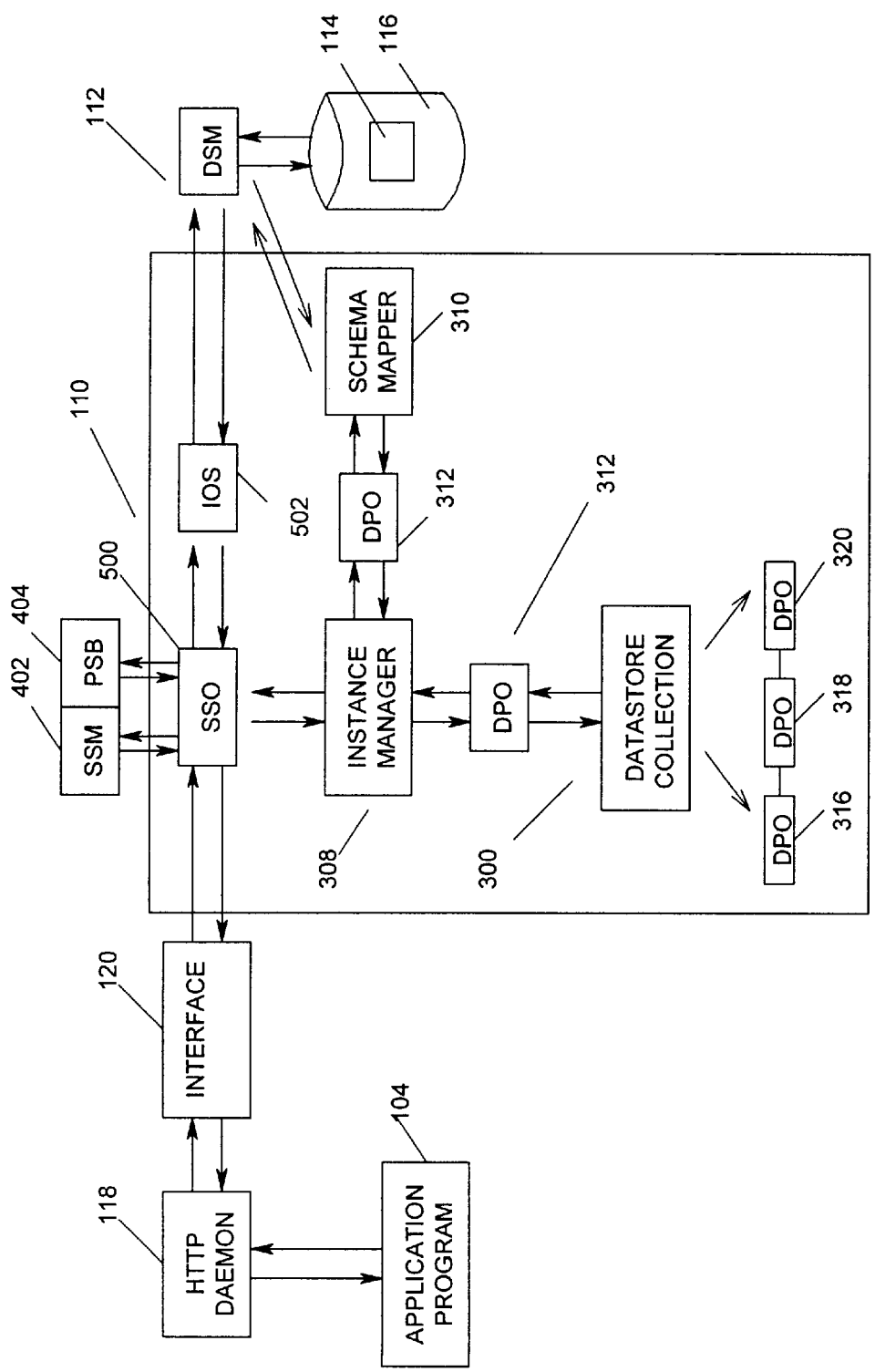
FIG. 5 is a block diagram illustrating the operation of the instance manager of the bridge according to the present invention.

FIG. 5 is a block diagram illustrating the operation of the instance manager 308 according to the present invention.

In the run-time environment, the datastore collections 300 and DPOs 316, 318, and 320 are managed (e.g., created, tracked, materialized, destroyed, and garbage collected) by the instance manager 308. The instance manager 308 also participates in the unit-of-work between the interface 120 and the external datastore 114.

The level of service provided by the instance manager 308 to the interface 120 will vary according to the characteristics of the external datastore 114. The instance manager 308 will exploit the capabilities of the external datastore 114 and the datastore manager 112 wherever possible, e.g., with regard to query functions, concurrency, security, etc.

The instance manager 308 uses service classes to isolate some of its functions, system services object (SSO) 500, interface object services (IOS) 502, and subschema mapper 402. The SSO 500 serves as a "factory" for creating DPO 312 and datastore collections 300 requested by query objects 304. The SSO 500 further serves as a transaction manager for the unit-of-work.

The SSO 500 receives a unit-of-work request from the interface 120. The SSO 500 creates a subschema mapper 402 and opens a PSB 404 for the unit-of-work request. The SSO 500 interfaces to the datastore manager 112 through the IOS 502. The IOS 502 opens and closes the connection to the datastore manager 112.

Using the schema mapper 310, the instance manager 308 populates the datastore collection 300 with DPOs 316, 318, and 320 that encapsulate data retrieved from the external datastore 114 via the datastore manager 112. The schema mapper 310 updates the external datastore 114 with changed data from the DPOs 316, 318, and 320, and adds or deletes the associated elements from the external datastore 114 when the DPOs 316, 318, and 320 are added or deleted.

The SSO 500 propagates a request to complete a unit-of-work to the instance manager 308, the datastore collection 300, the schema mapper 310, and the DPOs 316, 318, and 320, so as to coordinate the requests with the datastore manager 112 to maintain the integrity of the external datastore 114. Upon completion of the unit-of-work, the instance manager 308 deletes the DPOs 316, 318 and 320, the datastore collection 300, and schema mapper 310, from the memory of the server computer 102.

IMS™ Web Studio Wizard

Figure 6:
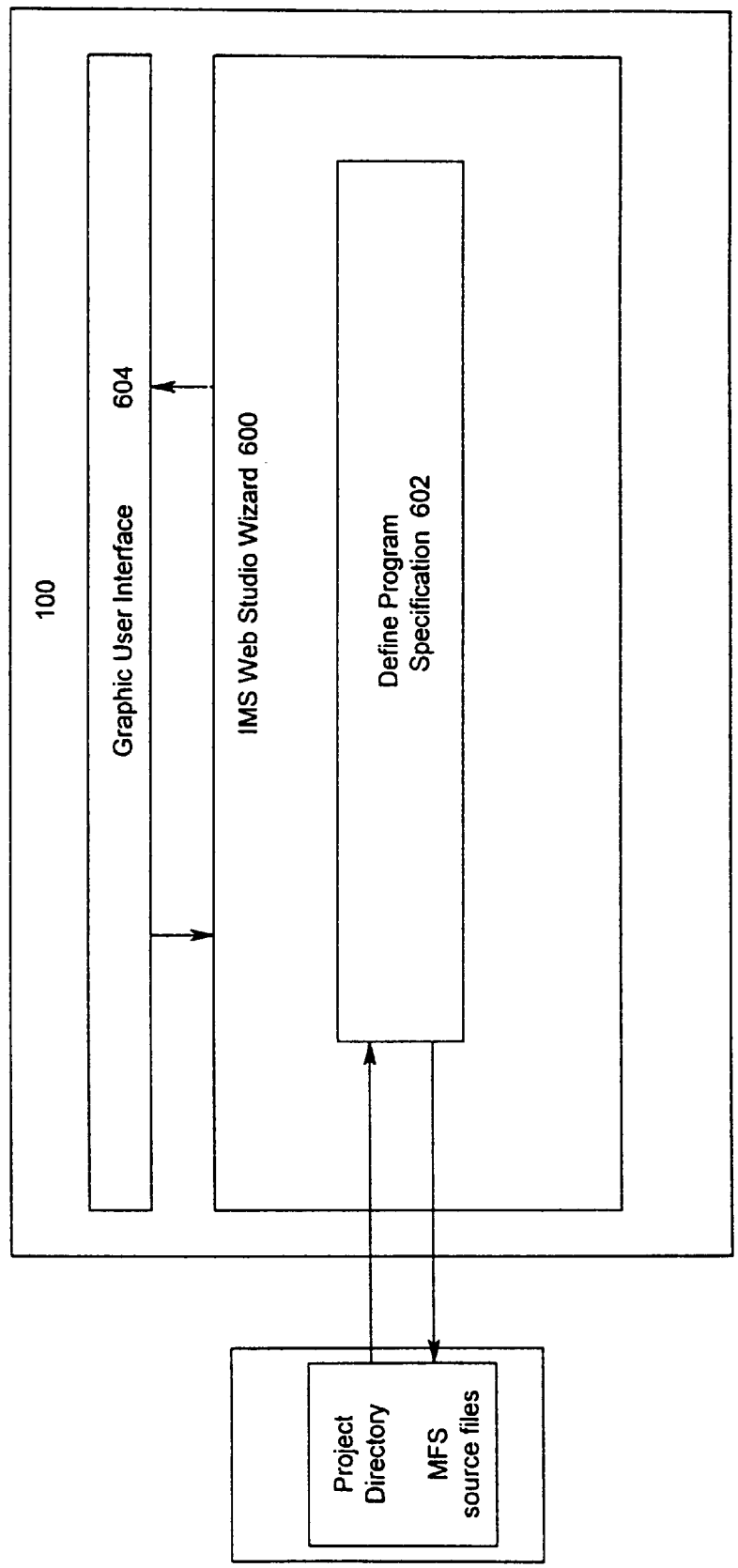
FIG. 6 is a block diagram illustrating the operation of the class definition tool according to the present invention.

FIG. 6 is a block diagram illustrating the operation of an IMS™ Web Studio Wizard 600 according to the present invention, wherein the programming specifications for the interface 120 used in the present invention are generated by the IMS™ Web Studio Wizard 600 to minimize the amount of programming required to access the datastore 114. The Wizard 600 executes under the control of the operating system 106 on the workstation 100 (which may be the same workstation 100 that executes the browser 104, but often is a different workstation 100) and interacts with an operator via a graphical user interface (GUI) 602.

A define program specification function 604 of the Wizard 600 captures characteristics of the interface 120 as programming specifications, which are stored (at least temporarily) in a project directory 606. These characteristics comprise information retrieved from Message Format Service (MFS) source files provided by the IMS™ datastore manager 112 and datastore 114, wherein MFS comprises a mechanism for communicating with an IMS™ datastore manager 112 and IMS™ datastore 114.

The define program specification then generates source code for the interface 120, wherein the source code is compiled, linked, and uploaded to the server 102 in executable form as the interface 120. The define program specification function 604 also generates the necessary HyperText Markup Language (HTML) pages for communicating with the browser 104. The interface 120 uses the HTML pages to mimic the MFS MIDs (Message Input Descriptors) and MFS MODs (Message Output Descriptors), which define the communication structures of input messages and an output messages for MFS. The interface 120 formats these HTML pages, MIDs, and MODs at runtime.

More information concerning the functions performed by the IMS™ Web Studio Wizard 600 in this regard can be found in the co-pending and commonly-assigned application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, now U.S. Pat. No. 5,781,739 which application is incorporated by reference herein.

The define program specification function 604 of the Wizard 600 may further augment the information provided by MFS by querying the operator to capture additional information to assist in defining the program specification. These user interface functions are addressed in more detail below.

Operation of the IMS™ Web Studio Wizard

FIGS. 7A–7J are "snapshots" of the IMS™ Web Studio Wizard, also known descriptively as a "task guide", that is displayed as at least a portion of the GUI 602 displayed on the monitor of the client computer 100 by the Wizard 600 in one embodiment of the present invention. These snapshots illustrate an exemplary sequence of events during the operation of the IMS™ Web Studio Wizard 600.

The task guide comprises a step-by-step procedure for creating program specifications for the interface 120 that accesses datastore persistent objects materialized from the datastore 114, wherein operator input is accepted into the computer 100 in response to the step-by-step procedure and the program specifications are created using the operator input. Generally, one or more subsequent steps are constrained in that they cannot be performed until one or more preceding steps are completed. In addition, choices (such as selections or values to be entered) in one or more subsequent steps are often based on operator input in one or more preceding steps.

Figure 7A:
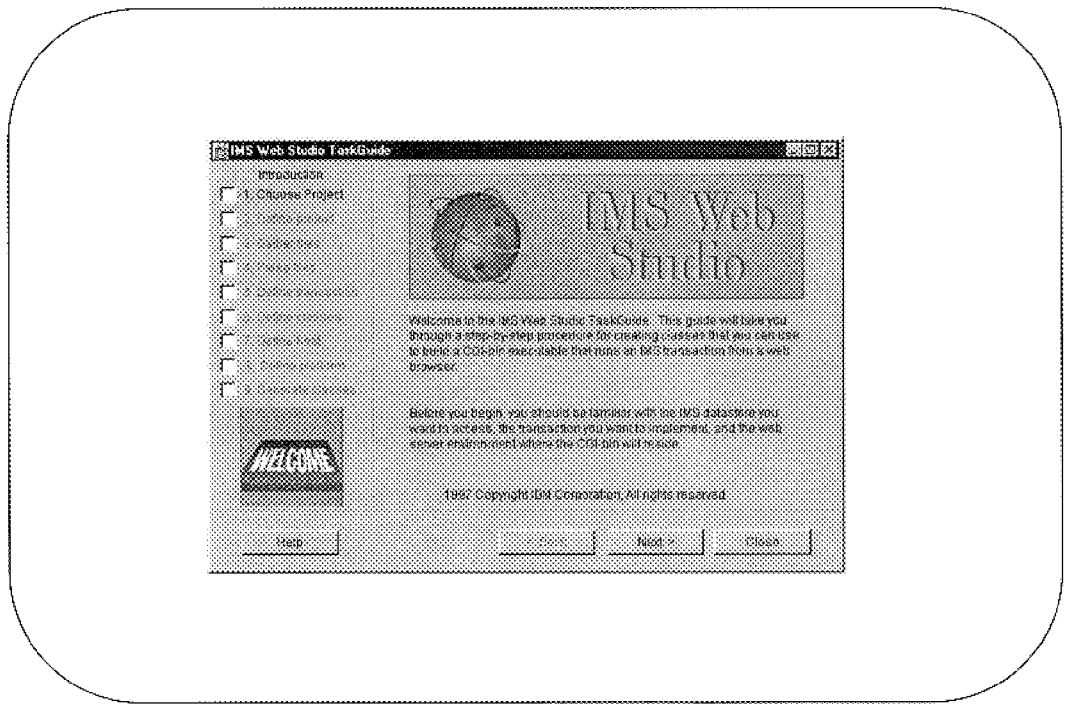
FIGS. 7A–7J are "snapshots" of an IMS™ Web Studio Wizard that comprises at least a portion of a graphical user interface displayed on the monitor of a client computer by one embodiment of the present invention.

Once invoked, the Wizard 600 displays an initial page for the IMS™ Web Studio Wizard 600, as shown in FIG. 7A. The initial page of FIG. 7A is an introduction page for the IMS™ Web Studio Wizard 600. This page is the beginning of the step-by-step procedure for creating the program specifications for the interface 120.

Along the left side of the page as checkboxes, wherein the checkboxes comprise completion indicators for each of the steps. The checkboxes are "checked" as each step is completed, wherein the steps comprise: "Choose project" to choose or define a project as container for organizing related files; "Define project" to gather source files for the project, wherein the source files are used to generate the program specifications for the interface 120; "Parse files" to parse the gathered source files to identify components therein; "Define transaction" to define the transactions to be performed by the interface 120 by selecting among the identified components of the parsed source files; "Define classes" to define class specifications for the defined transactions; "Define host" to define characteristics of the datastore 114 accessed by the interface 120; "Define platform" to define characteristics of the server computer 102 that executes the interface 120; and "Generate classes" to generate the interface 120 from the program specifications.

Prior to beginning the steps, the operator should be familiar with the IMS™ datastore manager 112 and IMS™ datastore 114 to be accessed, the transactions to be implemented, the Web server environment (e.g., the type of HTTP daemon 118 used), and where the object code for the interface 120 will reside (e.g., the CGI-BIN path on the server 102).

The page includes four buttons, including the Back, Next, Close, and Help buttons, which perform the following functions: (1) return to the previous step by selecting the Back button; (2) proceed to the next step by selecting the Next button; (3) terminate the Wizard 600 by selecting the Close button; and (4) display "Help" information by selecting the Help button.

Figure 7B:
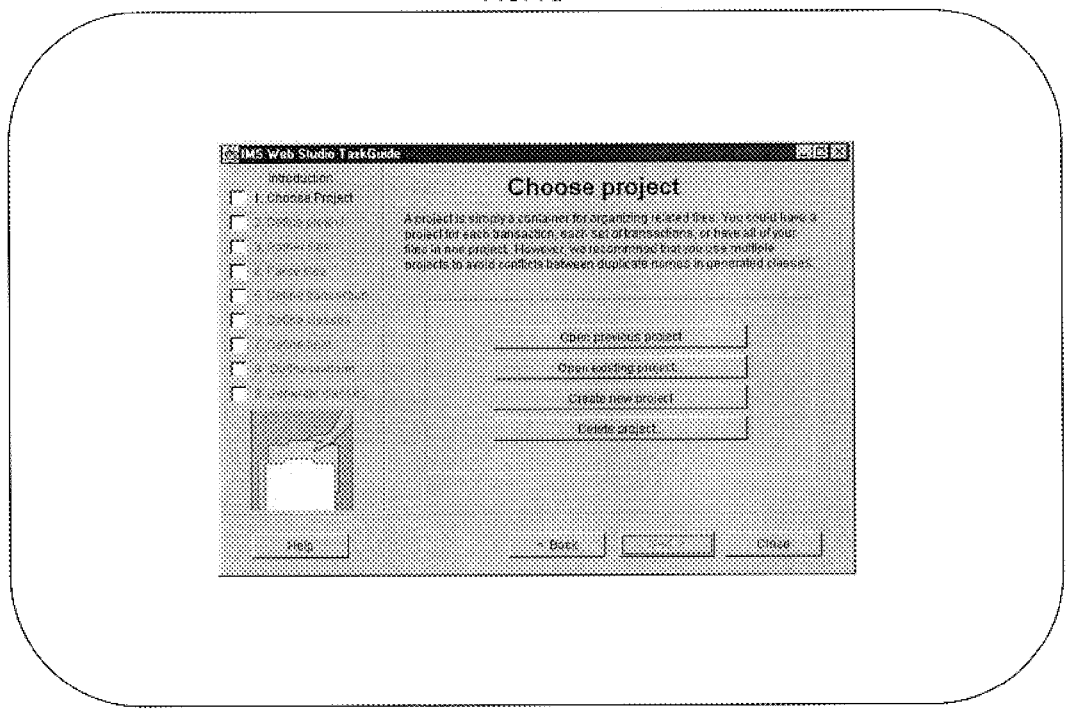

After selecting the Next button, the "Choose Project" page of FIG. 7B is displayed on the monitor of the client computer 100. A project is a folder or container or subdirectory for organizing related files. The operator could have a project for each target database, each application, or one project for all files. Generally, the operator should use multiple projects to avoid conflicts between duplicate names in the generated classes.

The Wizard 600 stores the entries made in most pages for a specified project and automatically inserts these stored entries into the fields when the project is re-opened. In addition, when a new project is created, the Wizard 600 inserts the stored entries for the last 5 projects as default values into the fields.

The page includes eight buttons, including the Open previous project, Open existing project, Create new project, Delete project, Back, Next, Close, and Help buttons, which perform the following functions: (1) open a previous project; (2) open an existing project; (3) create a new project; (4) delete a project; (5) return to the previous step by selecting the Back button; (6) proceed to the next step by selecting the Next button; (6) terminate the Wizard 600 by selecting the Close button; and (8) display "Help" information by selecting the Help button.

Figure 7C:
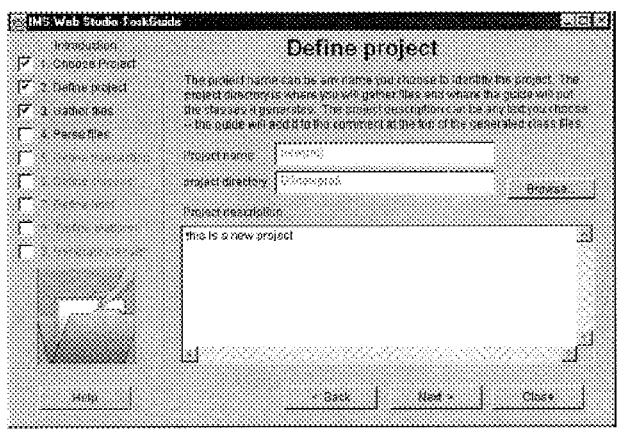

After selecting the Next button, the "Define Project" page of FIG. 7C is displayed on the monitor of the client computer 100. This page is used by the operator to define the project name, project directory, and project description. The project name is any name used to identify the project; the project directory is a subdirectory where the files for the project are gathered; and the project description is any text chosen by the operator.

The page includes three fields for specifying the project name, project directory, and project description, and four buttons, including the Back, Next, Close, and Help buttons, which perform the following functions: (1) return to the previous step by selecting the Back button; (2) proceed to the next step by selecting the Next button; (3) terminate the Wizard 600 by selecting the Close button; and (4) display "Help" information by selecting the Help button.

Figure 7D:
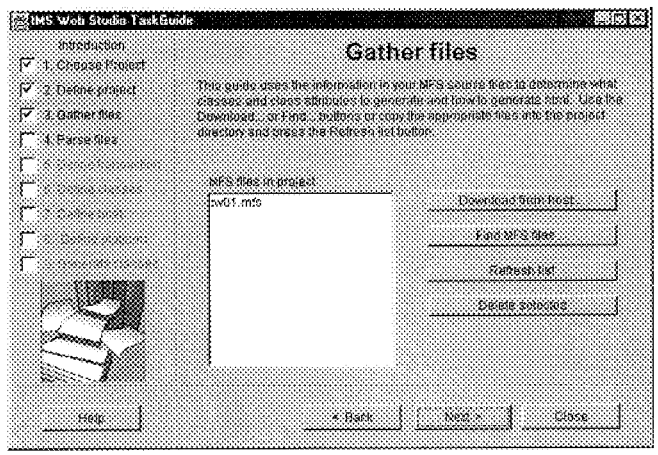

After selecting the Next button, the "Gather Files" page of FIG. 7D is displayed on the monitor of the client computer 100. This page is used by the operator to specify the MFS source files to be used by the Wizard 600, which are downloaded to the computer 100 if they are not already present and stored in the project directory. The Wizard 600 uses the information in the MFS source files to determine what classes and class attributes to generate for the interface 120 and how to generate the HTML pages used by the interface 120, the HTTP dameon 118 and the Web browser 104.

The page includes a list box for the MFS files and eight buttons, including the Download from host, Find MFS files, Refresh list, Delete Selected, Back, Next, Close, and Help buttons, which perform the following functions: (1) download files from the server 102; (2) find MFS files; (3) refresh the MFS file list; (4) delete the selected MFS files; (5) return to the previous step by selecting the Back button; (6) proceed to the next step by selecting the Next button; (7) terminate the Wizard 600 by selecting the Close button; and (8) display "Help" information by selecting the Help button.

Figure 7E:
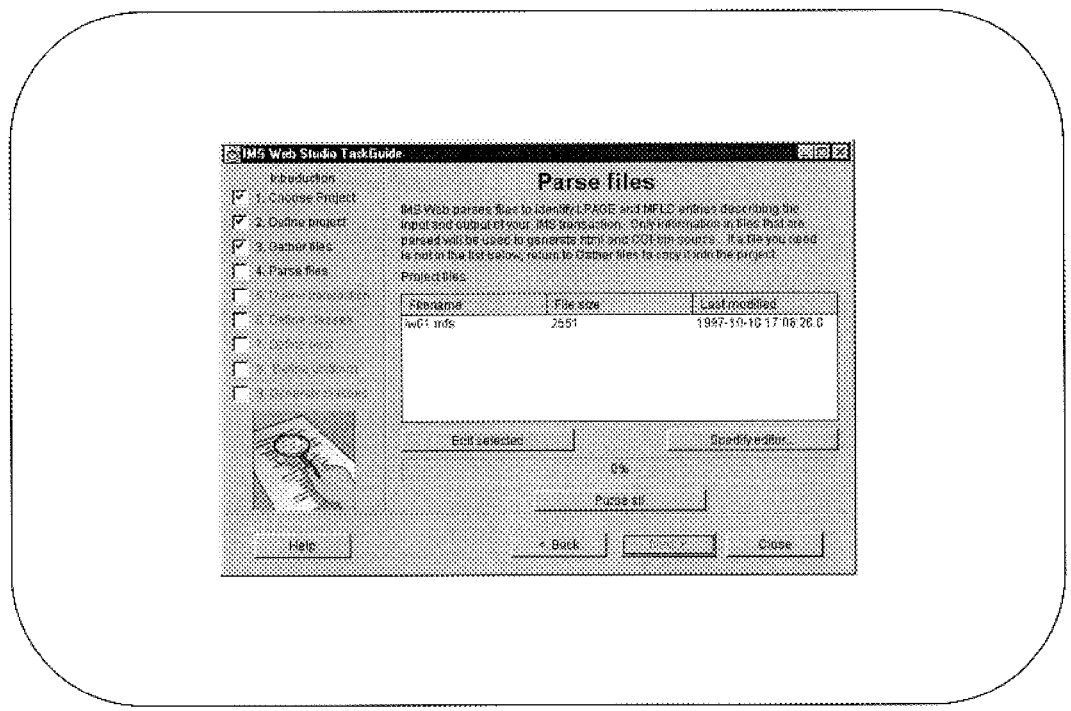

After selecting the Next button, the "Parse files" page of FIG. 7E is displayed on the monitor of the client computer 100. This page is used by the operator to specify the MFS files from the project directory to be used by the Wizard 600. The Wizard 600 parses the selected files to identify components of the source files, namely IMS™ Logical Page (LPAGE), IMS™ Message Field (MFLD), Message Input Descriptor (MIDs), and Message Output Descriptor (MOD). Only information in MFS source files that are parsed are used in later steps to define the classes and class attributes used to generate HTML pages and source code for the interface 120. Moreover, the "Parse files" step has to be completed before the remaining steps of the Wizard 600 can be performed.

The page includes a list box of selected files and seven buttons, including the Edit selected, Specify editor, Parse all, Back, Next, Close, and Help buttons, which perform the following functions: (1) edit selected MFS files; (2) specify the editor to use in step (1); (3) parse all of the files from the list box; (4) return to the previous step by selecting the Back button; (5) proceed to the next step by selecting the Next button; (6) terminate the Wizard 600 by selecting the Close button; and (7) display "Help" information by selecting the Help button. The page also includes a "progress" bar above the "Parse all" button to indicate the progress being made by the parse function.

Figure 7F:
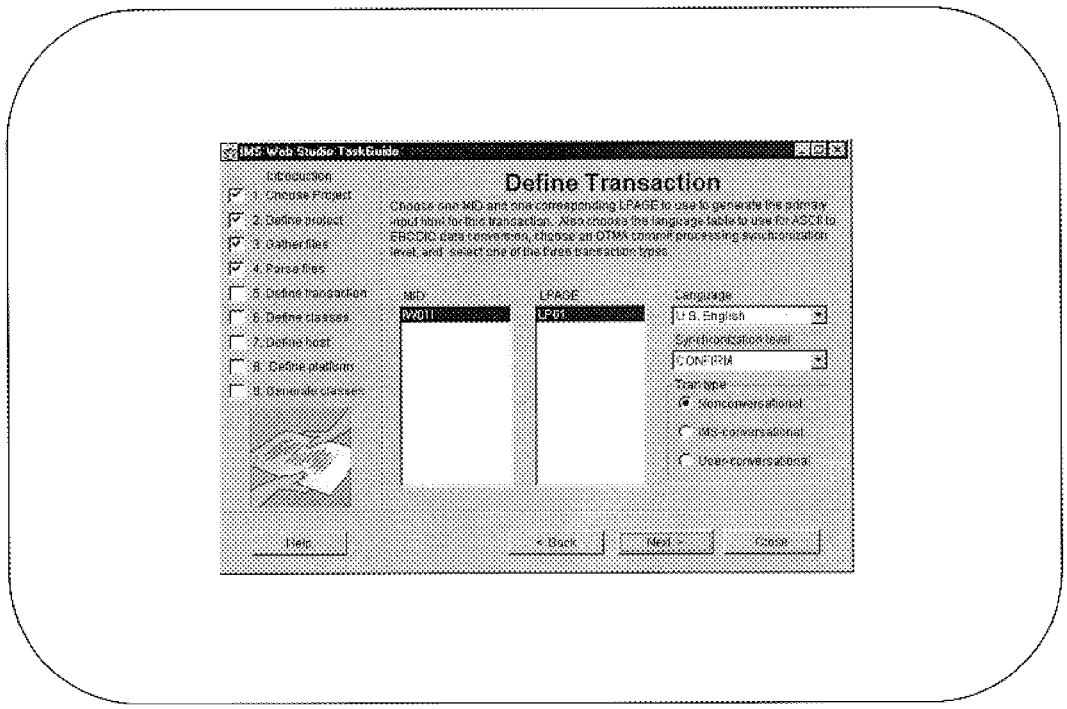

After selecting the Next button, the "Define transaction" page of FIG. 7F is displayed on the monitor of the client computer 100. This page is used by the operator to choose one IMS™ MID and one corresponding IMS LPAGE™ to use to generate the source code for the primary input HTML page for the transaction. The page also allows the operator to choose the language table to use for ASCII to EBCDIC data conversion, to choose a commit processing synchronization level for the IMS™ Open Transaction Multiple Access (OTMA) service, and to select whether or not the transaction is nonconversational, IMS-conversational, or user-conversational.

The page includes a list box of selected MID statements, a list box of selected LPAGE statements, a list of languages, a list of synchronization levels, and a series of nonconversational, IMS-conversational, or user-conversational selection items (known as "radiobuttons"). The page also includes four buttons, including the Back, Next, Close, and Help buttons, which perform the following functions: (1) return to the previous step by selecting the Back button; (2) proceed to the next step by selecting the Next button; (3) terminate the Wizard 600 by selecting the Close button; and (4) display "help" information by selecting the "Help" button. Moreover, the "Define transaction" step has to be completed before the remaining steps of the Wizard 600 can be performed.

Figure 7G:
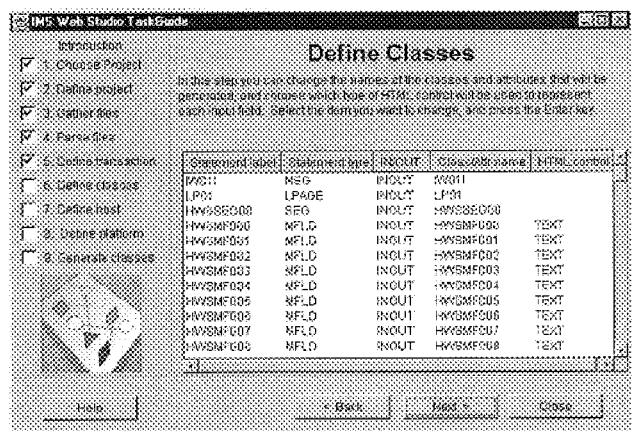

After selecting the Next button, the "Define classes" page of FIG. 7G is displayed on the monitor of the client computer 100. This page is used by the operator to define classes by selecting among the MFS statements, wherein LPAGE statements are used to define classes and MFLD statements are used to define class attributes. The names of the classes and attributes that will be generated can be changed as desired, and the operator can select which type of HTML control is to be used to represent each input field. At this page, the Wizard 600 knows which fields are input and which fields are output because of choices made at the "Define transaction" step.

The page includes a list box of MFS statements, wherein LPAGE statements become class names and MFLD statements become member variable or attribute names in the class indicated by the preceding LPAGE statement. The Wizard 600 checks that names are unique for the class and member variables. The page also includes four buttons, including the Back, Next, Close, and Help buttons, which perform the following functions: (1) return to the previous step by selecting the Back button; (2) proceed to the next step by selecting the Next button; (3) terminate the Wizard 600 by selecting the Close button; and (4) display "Help" information by selecting the Help button.

Figure 7H:
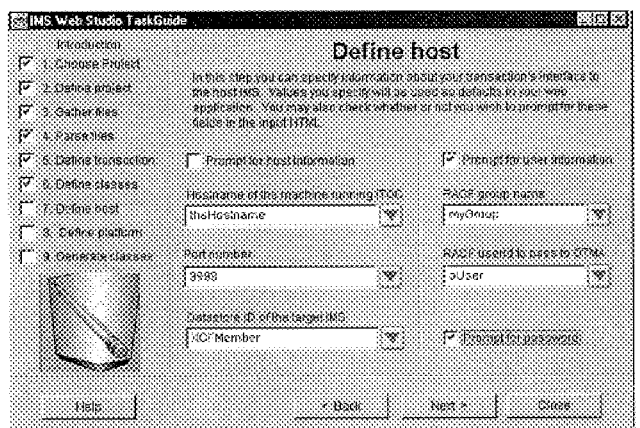

After selecting the Next button, the "Define host" page of FIG. 7H is displayed on the monitor of the client computer 100. This page is used by the operator to specify information about the IMS™ host machine or computer and whether the user is to be prompted for such information. The operator can enter the host name and port number of the computer executing the IMS™ TCP/IP OTMA connection (ITOC), the datastore ID of the target IMS datastore 116, and the Resource Access Control Facility (RACF) group name and user ID to pass to OTMA.

The page includes a checkbox to indicate that the user should be prompted for host information, a list box of host names of the computer executing ITOC, a list of port numbers of the computer executing ITOC, and a list of datastore ID of the target IMS™ datastore 116. The page also includes a checkbox to indicate that the user should be prompted for user information, a list of RACF group names and a list of RACF user IDs to pass to OTMA. The page also includes four buttons, including the Back, Next, Close, and Help buttons, which perform the following functions: (1) return to the previous step by selecting the Back button; (2) proceed to the next step by selecting the Next button; (3) terminate the Wizard 600 by selecting the Close button; and (4) display "help" information by selecting the Help button.

Figure 7I:
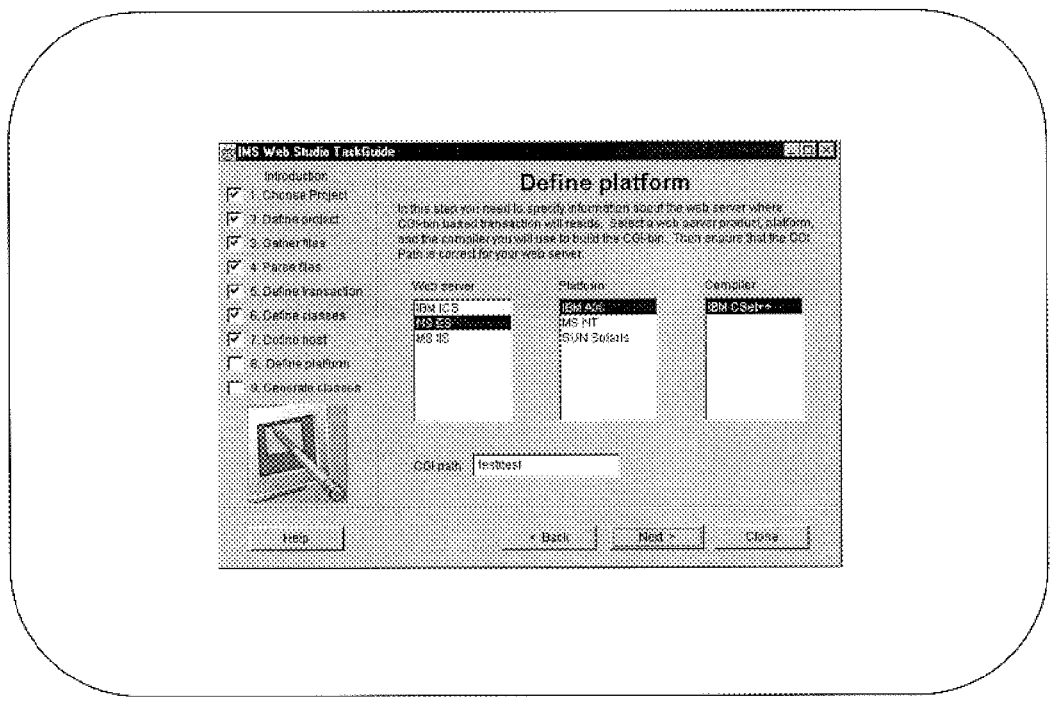

After selecting the Next button, the "Define platform" page of FIG. 7I is displayed on the monitor of the client computer 100. This page is used to specify information about the server computer 102 where the interface 120 resides and is executed. The page includes a list box of Web server, a list box of platforms, a list box of compilers, and a field for entering the CGI-BIN path. The operator selects a Web server (i.e., HTTP daemon 118) product type, platform, and compiler to use for the interface 120. These lists are updated from left to right as choices are made, so that selections made in the preceding lists will affect the choices presented by the Wizard 600 in the subsequent lists, i.e., the identifier of the Web server that executing the interface 120 constrains the identifier of the platform executing the Web server and the identifier of the compiler for generating the interface 120, and the identifier of the platform executing the Web server constrains the identifier of the compiler for generating the interface 120. The field for specifying the CGI-BIN path on the server 102 for the interface 120 is initially filled in by the Wizard with a default alias for the specified Web server.

The page also includes four buttons, including the Back, Next, Close, and Help buttons, which perform the following functions: (1) return to the previous step by selecting the Back button; (2) proceed to the next step by selecting the Next button; (3) terminate the Wizard 600 by selecting the Close button; and (4) display "help" information by selecting the Help button.

Figure 7J:
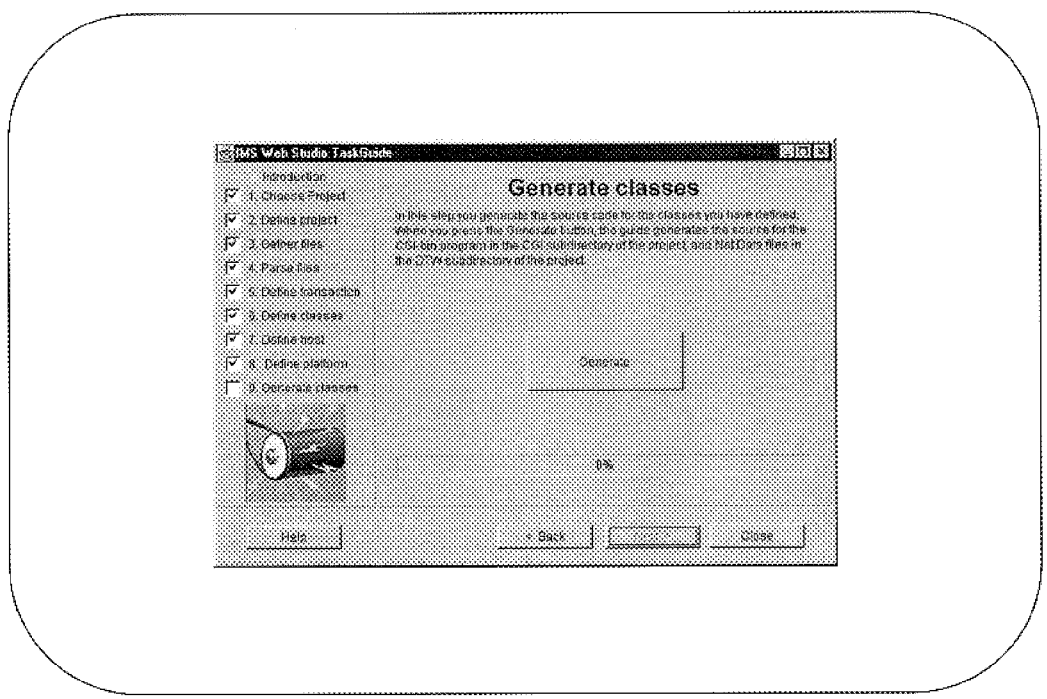

After selecting the Next button, the "Generate classes" page of FIG. 7J is displayed on the monitor of the client computer 100. This page is used to generate the program specifications for the interface 120, including the source code for the classes and class attributes that have been defined, the HTML pages, and any other necessary information (such as Net.Data™ files). When the operator invokes the Generate button, the guide generates the program specifications for the interface 120 (i.e., the CGI-BIN program) and stores the program specifications in the CGI-BIN subdirectory of the project.

The page includes five buttons, including the Generate, Back, Next, Close, and Help buttons, which perform the following functions: (1) generate the class definitions for the selected classes; (2) return to the previous step by selecting the Back button; (3) proceed to the next step by selecting the Next button; (4) terminate the Wizard 600 by selecting the Close button; and (5) display "Help" information by selecting the Help button. The page also includes a "progress" bar above the Generate button to indicate the progress being made in generating the class definitions for the selected classes.

Logic of the IMS™ Web Studio Wizard

Figure 8:
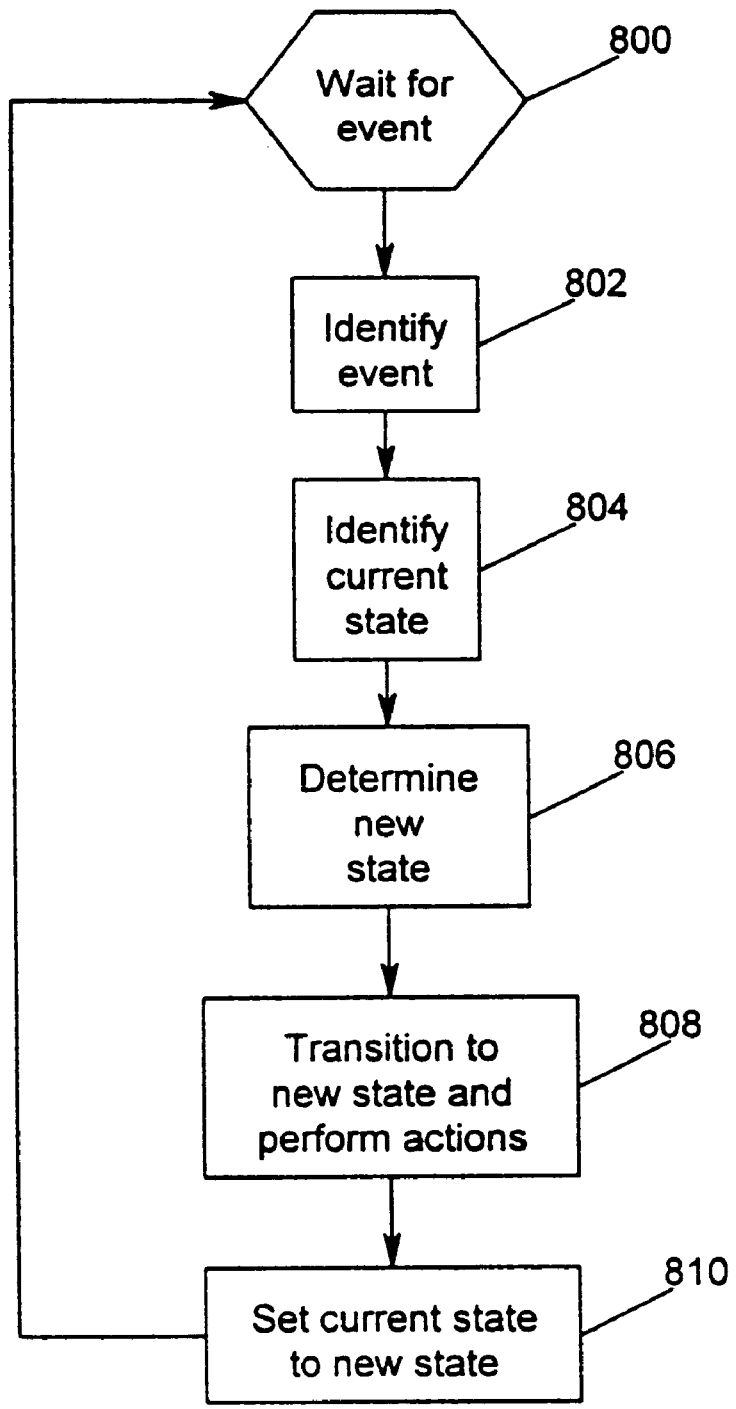
FIG. 8 is a flowchart that illustrates the general logic of a message or event-driven IMS™ Web Studio Wizard performing the steps of the present invention.
Figure 9:
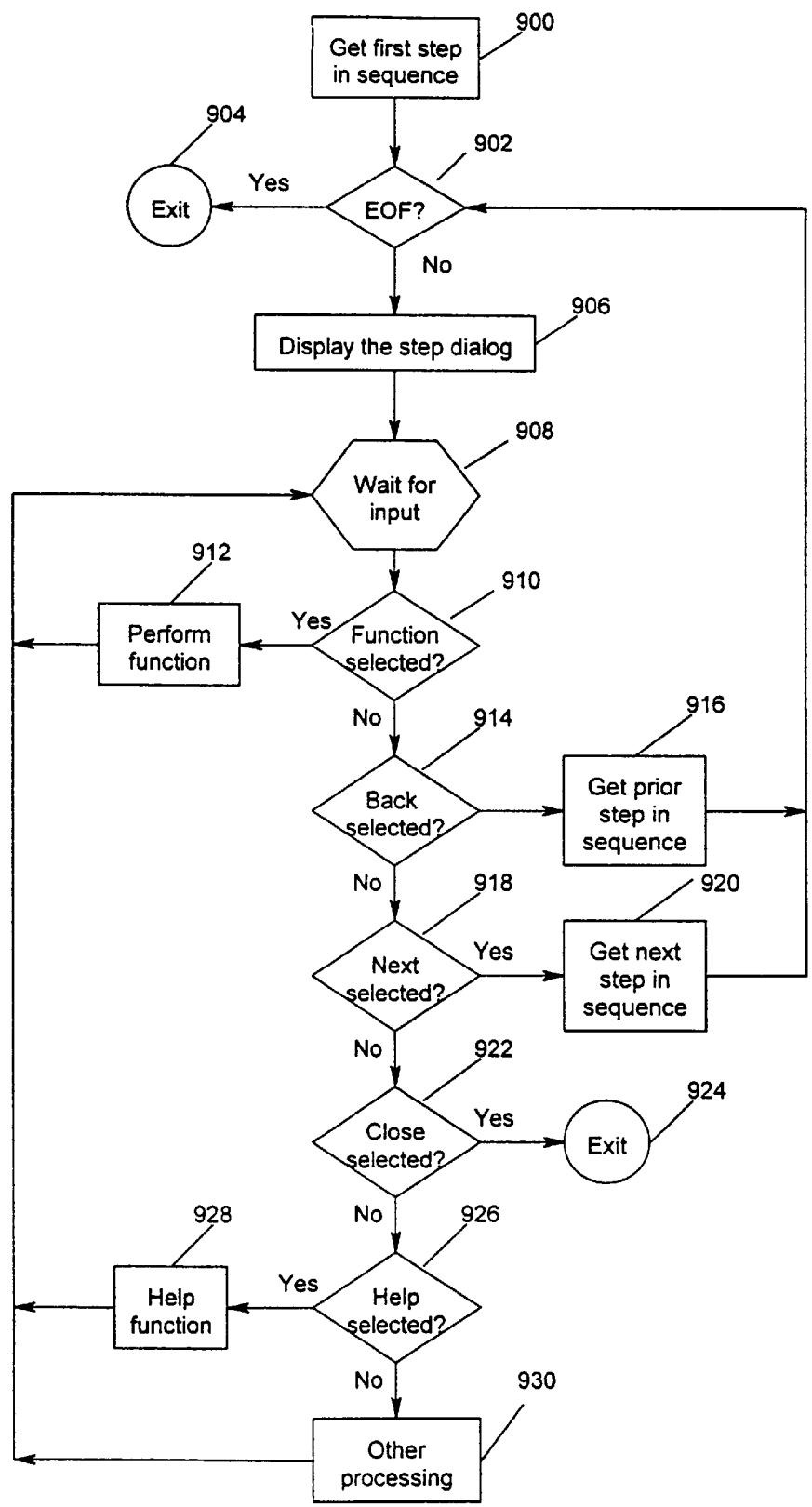
FIG. 9 is a flowchart that illustrates the general logic to perform a sequence of steps for the IMS™ Web Studio Wizard.

Flowcharts which illustrate the logic of the IMS™ Web Studio Wizard 600 of the present invention are shown in FIGS. 8 and 9. Those skilled in the art will recognize that this logic is provided for illustrative purposes only and that different logic may be used to accomplish the same results.

FIG. 8 is a flowchart that illustrates the general logic of a message or event-driven Wizard 600 performing the steps of the present invention. In such a Wizard 600, operations are performed when transitions are made, based upon the receipt of messages or events, from present or current states to new states.

Generally, the flowchart begins by waiting at block 800 for an event (e.g., a mouse button click). It should be appreciated that during this time, other tasks, e.g., by the operating system or other computer programs, may also be carried out. When an event occurs, control passes to block 802 to identify the event. Based upon the event, as well as the current state of the system determined in block 804, a new state is determined in block 806. In block 808, the logic transitions to the new state and performs any actions required for the transition. In block 810, the current state is set to the previously determined new state, and control returns to block 800 to wait for more input events.

The specific operations that are performed by block 808 when transitioning between states will vary depending upon the current state and the event. The various operations required to implement and maintain the IMS™ Web Studio Wizard 600 of the present invention represent particular events handled by the logic. However, it should be appreciated that these operations represent merely a subset of all of the events handled by the computer 100.

FIG. 9 is a flowchart that illustrates the general logic to perform a sequence of steps for the IMS™ Web Studio Wizard 600. The logic begins at block 900 when control transfers from FIG. 8 after the IMS™ Web Studio Wizard 600 is invoked or selected by the operator. Block 900 represents the computer 100 retrieving the first step in the sequence of pages (e.g., FIG. 7A) associated with the IMS™ Web Studio Wizard 600. Block 902 is a decision block that represents the computer 100 determining whether there are no more steps in the sequence associated with the IMS™ Web Studio Wizard 600. If so, control transfers to Block 904 to terminate the logic of the IMS™ Web Studio Wizard 600; otherwise, control transfers to Block 906.

Block 906 represents the computer 100 displaying the step page on the monitor. Block 908 represents the computer 100 waiting for operator input (e.g., a mouse button click signifying selection of a function). Thereafter, control passes to blocks 910-930 to identify the input and perform associated functions.

Block 910 is a decision block that represents the computer 100 determining whether the operator input is a function selected from the step page. If so, control transfers to Block 912; otherwise, control transfers to Block 914. Block 912 represents the computer 100 performing the selected function, e.g., any of the functions or group of functions described above in conjunction with FIGS. 7A–7J excluding the functions c: associated with the Back, Next, Close, and Help buttons. Thereafter, control transfers back to Block 908.

Block 914 is a decision block that represents the computer 100 determining whether the operator input is a "Back" function selected from the page. If so, control transfers to Block 916; otherwise, control transfers to Block 918. Block 916 represents the computer 100 retrieving the prior step page in the sequence. Thereafter, control transfers back to Block 902.

Block 918 is a decision block that represents the computer 100 determining whether the operator input is a "Next" function selected from the page. If so, control transfers to Block 920; otherwise, control transfers to Block 922. Block 920 represents the computer 100 retrieving the next step page in the sequence. Thereafter, control transfers back to Block 902.

Block 922 is a decision block that represents the computer 100 determining whether the operator input is a "Close" function selected from the page. If so, control transfers to Block 924; otherwise, control transfers to Block 926. Block 924 represents the computer 100 terminating the logic of the IMS™ Web Studio Wizard 600.

Block 926 is a decision block that represents the computer 100 determining whether the operator input is a "Help" function selected from the page. If so, control transfers to Block 928; otherwise, control transfers to Block 930. Block 928 represents the computer 100 performing the Help function. Thereafter, control transfers back to Block 908.

Block 930 represents the computer 100 performing other processing for other operator input. Thereafter, control transfers back to Block 908.

CONCLUSION

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. In addition, the present invention could be used to model other types of information.

In summary, the present invention discloses a method, apparatus, and article of manufacture for generating program specifications for a computer program that accesses datastore persistent objects materialized from a datastore. A "wizard" or "task guide" is displayed on a monitor attached to a computer, wherein the wizard comprises a step-by-step procedure for creating the program specifications. Operator input is accepted into the computer in response to the step-by-step procedure and the program specifications are created using the operator input.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for generating program specifications for a computer program comprising:
   (a) displaying a task guide on a monitor attached to a computer, wherein the task guide comprises a step-by-step procedure for creating program specifications for a computer program that accesses datastore persistent objects materialized from a datastore; and
   (b) accepting operator input into the computer in response to the step-by-step procedure and creating the program specifications using the operator input; and wherein the step-by-step procedure comprises:
   (1) defining a project as a container for organizing related files;
   (2) gathering source files for the project, wherein the source files are used to generate the program specifications for the computer program;
   (3) parsing the gathered source files to identify components therein;
   (4) defining transactions to be performed by the computer program by selecting among the identified components of the parsed source files;
   (5) defining class specifications for the defined transactions;
   (6) defining characteristics of the datastore accessed by the computer program;
   (7) defining characteristics of a computer that executes the computer program; and
   (8) generating the computer program from the program specifications.

2. The method of claim 1 above, wherein the defining step (1) further comprises displaying a user interface on the monitor and accepting operator input via the displayed user interface to organize the program specifications by project.

3. The method of claim 1 above, wherein the gathering step (2) further comprises displaying a user interface on the monitor and accepting operator input via the displayed user interface to specify one or more source files used to define the program specifications.

4. The method of claim 3 above, further comprising downloading the specified source files from another computer.

5. The method of claim 1 above, wherein the source files comprise Message Format Service source files.

6. The method of claim 5 above, wherein the parsing step (3) further comprises editing the specified source files.

7. The method of claim 6 above, wherein the parsing step (3) further comprises specifying an editor for the editing step.

8. The method of claim 1 above, wherein the parsing step (3) further comprises displaying a user interface on the monitor and accepting operator input via the displayed user interface to specify one or more source files to be parsed.

9. The method of claim 1 above, wherein the defining step (4) further comprises displaying a user interface on the monitor and accepting operator input via the displayed user interface to identify the transactions from the components of the parsed source files.

10. The method of claim 1, above, wherein the components are selected from a group comprising Logical Page (LPAGE) statements, Message Field (MFLD) statements, Message Input Descriptor (MID) statements, and Message Output Descriptor (MOD) statements.

11. The method of claim 10 above, wherein the LPAGE statements determine class names and the MFLD statements determine attribute names.

12. The method of claim 1 above, wherein the defining step (5) further comprises displaying a user interface on the monitor and accepting operator input via the displayed user interface to one or more characteristics of the defined class specification selected from a group comprising a class name, a class attribute name, and a control function associated with the class name and class attribute.

13. The method of claim 1 above, wherein the defining step (6) further comprises displaying a user interface on the monitor and accepting operator input via the displayed user interface to identify one or more characteristics selected from a group comprising one or more identifiers of a computer storing the datastore, an identifier of the datastore, and one or more identifiers for accessing the datastore.

14. The method of claim 1 above, wherein the defining step (7) further comprises displaying a user interface on the monitor and accepting operator input via the displayed user interface to identify one or more characteristics selected from a group comprising an identifier of a Web server executing the computer program, an identifier of a platform executing the Web server, an identifier of a compiler for generating the computer program, and an identifier of a location on the Web server for storing the computer program.

15. The method of claim 14 above, wherein the identifier of the Web server executing the computer program constrains the identifier of the platform executing the Web server and the identifier of the compiler for generating the computer program.

16. The method of claim 14 above, wherein the identifier of the platform executing the Web server constrains the identifier of the compiler for generating the computer program.

17. The method of claim 1 above, further comprising constraining execution of one or more subsequent steps until one or more preceding steps are completed.

18. The method of claim 1 above, further comprising storing one or more entries made in one or more of the steps for the defined project and automatically inserting the stored entries into fields of the steps when the project is re-opened.

19. The method of claim 1 above, further comprising storing one or more entries made in one or more of the steps for one or more defined projects and automatically providing one or more of the stored entries as default entries for fields of the steps when a new project is defined.

20. The method of claim 1 above, further comprising constraining selection choices in one or more subsequent steps based on operator input in one or more preceding steps.

21. The method of claim 1 above, wherein the program specifications define an interface computer program for providing network access to the datastore persistent objects materialized from the datastore.

22. The method of claim 21 above, wherein the interface computer program conforms to a standard selected from a group comprising Common Gateway Interface (CGI), Netscape Server Application Programming Interface (NSAPI), and Internet Connection Server Application Programming Interface (ICAPI).

23. The method of claim 1 above, wherein the program specifications define transactions between the computer program and a datastore manager.

24. The method of claim 1 above, wherein the program specifications define transactions between the computer program and a client program.

25. The method of claim 24 above, wherein the client computer program is a browser and the transactions are comprised of HyperText Markup Language (HTML) pages and HyperText Transfer Protocol (HTTP) messages.

26. The method of claim 1 above, wherein the program specifications include HyperText Markup Language specifications.

27. The method of claim 1 above, wherein the task guide includes a plurality of displayed completion indicators for each of the steps.

28. A computerized apparatus for generating program specifications for a computer program, comprising:
   (a) a computer having a monitor attached thereto; and
   (b) means performed by the computer, for:
      (1) displaying a task guide on the monitor attached to the computer, wherein the task guide comprises a step-by-step procedure for creating program specifications for a computer program that accesses datastore persistent objects materialized from a datastore; wherein the step-by-step procedure comprises:
         (i) means for defining a project as a container for organizing related files;
         (ii) means for gathering source files for the project, wherein the source files are used to generate the program specifications for the computer program;
         (iii) means for parsing the gathered source files to identify components therein;
         (iv) means for defining transactions to be performed by the computer program by selecting among the identified components of the parsed source files;
         (v) means for defining class specifications for the defined transactions;
         (vi) means for defining characteristics of the datastore accessed by the computer program;
         (vii) means for defining characteristics of a computer that executes the computer program; and
         (viii) means for generating the computer program from the program specifications; and
      (2) accepting operator input into the computer in response to the step-by-step procedure and creating the program specifications using the operator input.

29. The apparatus of claim 28 above, wherein the means for defining a project (i) further comprises means for displaying a user interface on the monitor and means for accepting operator input via the displayed user interface to organize the program specifications by project.

30. The apparatus of claim 28 above, wherein the means for gathering source files (ii) further comprises means for displaying a user interface on the monitor and means for accepting operator input via the displayed user interface to specify one or more source files used to define the program specifications.

31. The apparatus of claim 30 above, further comprising means, performed by the computer for downloading the specified source files from another computer.

32. The apparatus of claim 28 above, wherein the source files comprise Message Format Service source files.

33. The apparatus of claim 32 above, wherein the means for parsing the gathered source files (iii) further comprises means for editing the specified source files.

34. The apparatus of claim 33 above, wherein the means for parsing the gathered source files (iii) further comprises means for specifying an editor for the editing step.

35. The apparatus of claim 28 above, wherein the means for parsing the gathered source files (iii) further comprises means for displaying a user interface on the monitor and accepting operator input via the displayed user interface to specify one or more source files to be parsed.

36. The apparatus of claim 28 wherein the means for defining transactions (iv) further comprises means for displaying a user interface on the monitor and means for accepting operator input via the displayed user interface to identify the transactions from the components of the parsed source files.

37. The apparatus of claim 28 above, wherein the components are selected from a group comprising Logical Page (LPAGE) statements, Message Field (MFLD) statements, Message Input Descriptor (MID) statements, and Message Output Descriptor (MOD) statements.

38. The apparatus of claim 37 above, wherein the LPAGE statements determine class names and the MFLD statements determine attribute names.

39. The apparatus of claim 28 above, wherein the means for defining class specifications (v) further comprises means for displaying a user interface on the monitor and means for accepting operator input via the displayed user interface to one or more characteristics of the defined class specification selected from a group comprising a class name, a class attribute name, and a control function associated with the class name and class attribute.

40. The apparatus of claim 28 above, wherein the means for defining characteristics (vi) further comprises means for displaying a user interface on the monitor and means for accepting operator input via the displayed user interface to identify one or more characteristics selected from a group comprising one or more identifiers of a computer storing the datastore, an identifier of the datastore, and one or more identifiers for accessing the datastore.

41. The apparatus of claim 28 above, wherein the means for defining characteristics(vii) further comprises means for displaying a user interface on the monitor and means for accepting operator input via the displayed user interface to identify one or more characteristics selected from a group comprising an identifier of a Web server executing the computer program, an identifier of a platform executing the Web server, an identifier of a compiler for generating the computer program, and an identifier of a location on the Web server for storing the computer program.

42. The apparatus of claim 41 above, wherein the identifier of the Web server executing the computer program comprises means for constraining the identifier of the platform executing the Web server and the identifier of the compiler for generating the computer program.

43. The apparatus of claim 41 above, wherein the identifier of the platform executing the Web server comprises means for constraining the identifier of the compiler for generating the computer program.

44. The apparatus of claim 28 above, further comprising means perfmored by the computer for constraining execution of one or more subsequent steps until one or more preceding steps are completed.

45. The apparatus of claim 28 above, further comprising means performed by the computer for:
   storing one or more entries made in one or more of the steps for the defined project; and
   automatically inserting the stored entries into fields of the steps when the project is reopened.

46. The apparatus of claim 28 above, further comprising means performed by the computer for:
   storing one or more entries made in one or more of the steps for one or more defined projects; and
   automatically providing one or more of the stored entries as default entries for fields of the steps when a new project is defined.

47. The apparatus of claim 28 above, further comprising means performed by the computer for constraining selection choices in one or more subsequent steps based on operator input in one or more preceding steps.

48. The apparatus of claim 28 above, wherein the program specifications define means for an interface computer program to provide network access to the datastore persistent objects materialized from the datastore.

49. The apparatus of claim 48 above, wherein the interface computer program conforms to a standard selected from a group comprising Common Gateway Interface (CGI), Netscape Server Application Programming Interface (NSAPI), and Internet Connection Server Application Programming Interface (ICAPI).

50. The apparatus of claim 28 above, wherein the program specifications define transactions between the computer program and a datastore manager.

51. The apparatus of claim 28 above, wherein the program specifications define transactions between the computer program and a client program.

52. The apparatus of claim 51 above, wherein the client computer program is a browser and the transactions are comprised of HyperText Markup Language (HTML) pages and HyperText Transfer Protocol (HTTP) messages.

53. The apparatus of claim 28 above, wherein the program specifications include HyperText Markup Language specifications.

54. The apparatus of claim 28 above, wherein the task guide includes a plurality of displayed completion indicators for each of the steps.

55. An article of manufacture comprising a computer program carrier embodying one or more computer programs that, when executed by a computer, causes the computer to perform method steps for generating program specifications for a computer program the method comprising the steps of:
   (a) displaying a task guide on a monitor attached to the computer, wherein the task guide comprises a step-by-step procedure for creating program specifications for a computer program that accesses datastore persistent objects materialized from a datastore, wherein the step-by-step procedure comprises:
      (i) defining a project as a container for organizing related files;
      (ii) gathering source files for the project, wherein the source files are used to generate the program specifications for the computer program;
      (iii) parsing the gathered source files to identify components therein;
      (iv) defining transactions to be performed by the computer program by selecting among the identified components of the parsed source files;
      (v) defining class specifications for the defined transactions;
      (vi) defining characteristics of the datastore accessed by the computer program;
      (vii) defining characteristics of a computer that executes the computer program; and
      (viii) generating the computer program from the program specifications; and
   (b) accepting operator input into the computer in response to the step-by-step procedure and creating the program specifications using the operator input.

56. The article of manufacture of claim 55 above, wherein the defining a project (i) further comprises displaying a user interface on the monitor and accepting operator input via the displayed user interface to organize the program specifications by project.

57. The article of manufacture of claim 55 above, wherein the gathering source files (ii) further comprises displaying a user interface on the monitor and accepting operator input via the displayed user interface to specify one or more source files used to define the program specifications.

58. The article of manufacture of claim 57 above, further comprising downloading the specified source files from another computer.

59. The article of manufacture of claim 55 above, wherein the source files comprise Message Format Service source files.

60. The article of manufacture of claim 59 above, wherein the parsing the gathered source files (iii) further comprises editing the specified source files.

61. The article of manufacture of claim 60 above, wherein the parsing the gathered source files (iii) further comprises specifying an editor for the editing step.

62. The article of manufacture of claim 55 above, wherein the parsing the gathered source files (iii) further comprises displaying a user interface on the monitor and accepting operator input via the displayed user interface to specify one or more source files to be parsed.

63. The article of manufacture of claim 55 above, wherein the defining transactions (iv) further comprises displaying a user interface on the monitor and accepting operator input via the displayed user interface to identify the transactions from the components of the parsed source files.

64. The article of manufacture of claim 55 above, wherein the components are selected from a group comprising Logical Page (LPAGE) statements, Message Field (MFLD) statements, Message Input Descriptor (MID) statements, and Message Output Descriptor (MOD) statements.

65. The article of manufacture of claim 64 above, wherein the LPAGE statements determine class names and the MFLD statements determine attribute names.

66. The article of manufacture of claim 55 above, wherein the defining class specifications (v) further comprises displaying a user interface on the monitor and accepting operator input via the displayed user interface to one or more characteristics of the defined class specification selected from a group comprising a class name, a class attribute name, and a control function associated with the class name and class attribute.

67. The article of manufacture of claim 55 above, wherein the defining characteristics (vi) further comprises displaying a user interface on the monitor and accepting operator input via the displayed user interface to identify one or more characteristics selected from a group comprising one or more identifiers of a computer storing the datastore, an identifier of the datastore, and one or more identifiers for accessing the datastore.

68. The article of manufacture of claim 55 above, wherein the defining characteristics(vii) further comprises displaying a user interface on the monitor and accepting operator input via the displayed user interface to identify one or more characteristics selected from a group comprising an identifier of a Web server executing the computer program, an identifier of a platform executing the Web server, an identifier of a compiler for generating the computer program, and an identifier of a location on the Web server for storing the computer program.

69. The article of manufacture of claim 68 above, wherein the identifier of the Web server executing the computer program constrains the identifier of the platform executing the Web server and the identifier of the compiler for generating the computer program.

70. The article of manufacture of claim 68 above, wherein the identifier of the platform executing the Web server constrains the identifier of the compiler for generating the computer program.

71. The article of manufacture of claim 55 further comprising constraining execution of one or more subsequent steps until one or more preceding steps are completed.

72. The article of manufacture of claim 55 above, further comprising storing one or more entries made in one or more of the steps for the defined project and automatically inserting the stored entries into fields of the steps when the project is re-opened.

73. The article of manufacture of claim 55 above, further comprising storing one or more entries made in one or more of the steps for one or more defined projects and automatically providing one or more of the stored entries as default entries for fields of the steps when a new project is defined.

74. The article of manufacture of claim 55 above, further comprising constraining selection choices in one or more subsequent steps based on operator input in one or more preceding steps.

75. The article of manufacture of claim 55 above, wherein the program specifications define an interface computer program for providing network access to the datastore persistent objects materialized from the datastore.

76. The article of manufacture of claim 75 above, wherein the interface computer program conforms to a standard selected from a group comprising Common Gateway Interface (CGI), Netscape Server Application Programming Interface (NSAPI), and net Connection Server Application Programming Interface (ICAPI).

77. The article of manufacture of claim 55 above, wherein the program specifications define transactions between the computer program and a datastore manager.

78. The article of manufacture of claim 55 above, wherein the program specifications define transactions between the computer program and a client program.

79. The article of manufacture of claim 78 above, wherein the client computer program is a browser and the transactions are comprised of HyperText Markup Language (HTML) pages and HyperText Transfer Protocol (HTTP) messages.

80. The article of manufacture of claim 55 above, wherein the program specifications include HyperText Markup Language specifications.

81. The article of manufacture of claim 55 above, wherein the task guide includes a plurality of displayed completion indicators for each of the steps.

* * * * *

UNITED STATES PATENT AND TRADEMARK OFFICE
CERTIFICATE OF CORRECTION

PATENT NO.   : 6,128,622
DATED        : October 3, 2000
INVENTOR(S)  : Mark Alan Bach et al.

It is certified that error appears in the above-identified patent and that said Letters Patent is hereby corrected as shown below:

<u>Title page,</u>
Item [54], Title, should read -- USER INTERFACE FOR CREATING PROGRAM SPECIFICATIONS FOR ACCESSING DATABASE PERSISTENT OBJECTS --.
Item [56], References Cited, U.S. PATENT DOCUMENTS, "Hefferman et al." should read -- Heffernan et al. --; "Weinreb et al." should read -- Khoyi et al. --; after "5,421,015" insert -- 5,426,747  6/1995   Weinreb et al. --;
OTHER PUBLICATIONS, "Muchenhaupt, Kenneth J.," reference, "koh.kyungpook.as,kr/" should read -- koh.kuyungpook.as.kr/ --; and "Howe III.," reference, "voyager/C++" should read -- Voyager/C++ --.

<u>Column 19,</u>
Line 59, "perfmored" should read -- performed --.

<u>Column 22,</u>
Line 41, "net" should read -- Internet --.

Signed and Sealed this

Eighteenth Day of May, 2004

JON W. DUDAS
*Acting Director of the United States Patent and Trademark Office*